United States Patent
Alexander et al.

(10) Patent No.: US 10,031,338 B2
(45) Date of Patent: Jul. 24, 2018

(54) SYSTEMS, DEVICES, AND METHODS FOR EYEBOX EXPANSION IN WEARABLE HEADS-UP DISPLAYS

(71) Applicant: THALMIC LABS INC., Kitchener (CA)

(72) Inventors: Stefan Alexander, Elmira (CA);
Matthew Bailey, Kitchener (CA);
Vance R. Morrison, Kitchener (CA);
Lloyd Frederick Holland, Kitchener (CA)

(73) Assignee: THALMIC LABS INC., Kitchener (CA)

( * ) Notice: Subject to any disclaimer, the term of this patent is extended or adjusted under 35 U.S.C. 154(b) by 75 days.

(21) Appl. No.: 15/046,234

(22) Filed: Feb. 17, 2016

(65) Prior Publication Data
US 2016/0377865 A1 Dec. 29, 2016

Related U.S. Application Data

(60) Provisional application No. 62/117,316, filed on Feb. 17, 2015, provisional application No. 62/156,736, (Continued)

(51) Int. Cl.
*G09G 5/00* (2006.01)
*G02B 27/01* (2006.01)
(Continued)

(52) U.S. Cl.
CPC ......... *G02B 27/0172* (2013.01); *G02B 26/10* (2013.01); *G02B 27/0081* (2013.01);
(Continued)

(58) Field of Classification Search
None
See application file for complete search history.

(56) References Cited

U.S. PATENT DOCUMENTS

| 3,408,133 A | 10/1968 | Lee |
| 3,712,716 A | 1/1973 | Cornsweet et al. |

(Continued)

FOREIGN PATENT DOCUMENTS

| JP | 61-198892 A | 9/1986 |
| JP | 10-319240 A | 12/1998 |

(Continued)

OTHER PUBLICATIONS

International Search Report and Written Opinion dated Apr. 25, 2017 for corresponding International Application No. PCT/US2016/067246, 12 pages.

(Continued)

*Primary Examiner* — Ifedayo Iluyomade
(74) *Attorney, Agent, or Firm* — Seed IP Law Group LLP

(57) ABSTRACT

Systems, devices, and methods for eyebox expansion by exit pupil replication in scanning laser-based wearable heads-up displays ("WHUDs") are described. The WHUDs described herein each include a scanning laser projector ("SLP"), a holographic combiner, and an optical replicator positioned in the optical path therebetween. For each light signal generated by the SLP, the optical replicator receives the light signal and redirects each one of N>1 instances of the light signal towards the holographic combiner effectively from a respective one of N spatially-separated virtual positions for the SLP. The holographic combiner converges each one of the N instances of the light signal to a respective one of N spatially-separated exit pupils at the eye of the user. In this way, multiple instances of the exit pupil are distributed over the area of the eye and the eyebox of the WHUD is expanded.

25 Claims, 9 Drawing Sheets

Related U.S. Application Data filed on May 4, 2015, provisional application No. 62/242,844, filed on Oct. 16, 2015.

(51) Int. Cl.
  *G06F 3/01* (2006.01)
  *G02B 26/10* (2006.01)
  *G02B 27/00* (2006.01)
  *G03H 1/26* (2006.01)
  *G09G 3/00* (2006.01)

(52) U.S. Cl.
  CPC ........... *G02B 27/017* (2013.01); *G03H 1/265* (2013.01); *G03H 1/2645* (2013.01); *G06F 3/013* (2013.01); *G09G 3/001* (2013.01); *G02B 2027/0112* (2013.01); *G02B 2027/0123* (2013.01); *G02B 2027/0125* (2013.01); *G02B 2027/0174* (2013.01); *G02B 2027/0178* (2013.01); *G03H 2001/266* (2013.01)

(56) References Cited

U.S. PATENT DOCUMENTS

| | | |
|---|---|---|
| 4,978,213 A | 12/1990 | El Hage |
| 5,103,323 A | 4/1992 | Magarinos et al. |
| 5,231,674 A | 7/1993 | Cleveland et al. |
| 5,467,104 A | 11/1995 | Furness, III et al. |
| 5,589,956 A | 12/1996 | Morishima et al. |
| 5,596,339 A | 1/1997 | Furness, III et al. |
| 5,742,421 A | 4/1998 | Wells et al. |
| 6,008,781 A | 12/1999 | Furness, III et al. |
| 6,027,216 A | 2/2000 | Guyton et al. |
| 6,184,847 B1 | 2/2001 | Fateh et al. |
| 6,204,829 B1 | 3/2001 | Tidwell |
| 6,236,476 B1 | 5/2001 | Son et al. |
| 6,317,103 B1 | 11/2001 | Furness, III et al. |
| 6,353,503 B1 | 3/2002 | Spitzer et al. |
| 6,377,277 B1 | 4/2002 | Yamamoto |
| 6,639,570 B2 | 10/2003 | Furness, III et al. |
| 6,972,734 B1 | 12/2005 | Ohshima et al. |
| 7,473,888 B2 | 1/2009 | Wine et al. |
| 7,640,007 B2 | 12/2009 | Chen et al. |
| 7,684,105 B2 | 3/2010 | Lamontagne et al. |
| 7,747,113 B2 | 6/2010 | Mukawa et al. |
| 7,773,111 B2 | 8/2010 | Cleveland et al. |
| 7,850,306 B2 | 12/2010 | Uusitalo et al. |
| 7,925,100 B2 | 4/2011 | Howell et al. |
| 7,927,522 B2 | 4/2011 | Hsu |
| 8,120,828 B2 | 2/2012 | Schwerdtner |
| 8,179,604 B1 | 5/2012 | Prada Gomez et al. |
| 8,188,937 B1 | 5/2012 | Amafuji et al. |
| 8,355,671 B2 | 1/2013 | Kramer et al. |
| 8,560,976 B1 | 10/2013 | Kim |
| 8,634,119 B2 | 1/2014 | Bablumyan et al. |
| 8,666,212 B1 | 3/2014 | Amirparviz |
| 8,704,882 B2 | 4/2014 | Turner |
| 8,922,481 B1 | 12/2014 | Kauf |
| 8,922,898 B2 | 12/2014 | Legerton et al. |
| 8,970,571 B1 | 3/2015 | Wong et al. |
| 8,971,023 B2 | 3/2015 | Olsson et al. |
| 9,086,687 B2 | 7/2015 | Park et al. |
| 9,135,708 B2 | 9/2015 | Ebisawa |
| 2001/0033402 A1 | 10/2001 | Popovich |
| 2002/0003627 A1 | 1/2002 | Rieder |
| 2002/0007118 A1 | 1/2002 | Adachi et al. |
| 2002/0030636 A1 | 3/2002 | Richards |
| 2002/0093701 A1 | 7/2002 | Zhang et al. |
| 2002/0120916 A1 | 8/2002 | Snider, Jr. |
| 2004/0174287 A1 | 9/2004 | Deak |
| 2005/0012715 A1 | 1/2005 | Ford |
| 2006/0238707 A1 | 10/2006 | Elvesjo et al. |
| 2007/0078308 A1 | 4/2007 | Daly |
| 2007/0132785 A1 | 6/2007 | Ebersole, Jr. et al. |
| 2009/0109241 A1 | 4/2009 | Tsujimoto |
| 2009/0179824 A1 | 7/2009 | Tsujimoto et al. |
| 2009/0207464 A1 | 8/2009 | Wiltshire et al. |
| 2009/0258669 A1 | 10/2009 | Nie et al. |
| 2009/0322653 A1 | 12/2009 | Putilin et al. |
| 2010/0053555 A1 | 3/2010 | Enriquez et al. |
| 2010/0060551 A1 | 3/2010 | Sugiyama et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0239776 A1 | 9/2010 | Yajima et al. |
| 2012/0002256 A1 | 1/2012 | Lacoste et al. |
| 2012/0139817 A1 | 6/2012 | Freeman |
| 2012/0169752 A1 | 7/2012 | Kurozuka |
| 2012/0182309 A1 | 7/2012 | Griffin et al. |
| 2012/0188158 A1 | 7/2012 | Tan et al. |
| 2012/0249797 A1 | 10/2012 | Haddick et al. |
| 2012/0290401 A1 | 11/2012 | Neven |
| 2012/0302289 A1 | 11/2012 | Kang |
| 2013/0009853 A1 | 1/2013 | Hesselink et al. |
| 2013/0016292 A1 | 1/2013 | Miao et al. |
| 2013/0016413 A1 | 1/2013 | Saeedi et al. |
| 2013/0088413 A1 | 4/2013 | Raffle et al. |
| 2013/0135722 A1 | 5/2013 | Yokoyama |
| 2013/0165813 A1 | 6/2013 | Chang et al. |
| 2013/0169560 A1 | 7/2013 | Cederlund et al. |
| 2013/0198694 A1 | 8/2013 | Rahman et al. |
| 2013/0215235 A1 | 8/2013 | Russell |
| 2013/0222384 A1 | 8/2013 | Futterer |
| 2013/0265437 A1 | 10/2013 | Thörn et al. |
| 2013/0285901 A1 | 10/2013 | Lee et al. |
| 2013/0300652 A1 | 11/2013 | Raffle et al. |
| 2013/0332196 A1 | 12/2013 | Pinsker |
| 2013/0335302 A1 | 12/2013 | Crane et al. |
| 2014/0045547 A1 | 2/2014 | Singamsetty et al. |
| 2014/0125760 A1 | 5/2014 | Au et al. |
| 2014/0198034 A1 | 7/2014 | Bailey et al. |
| 2014/0198035 A1 | 7/2014 | Bailey et al. |
| 2014/0202643 A1 | 7/2014 | Hikmet et al. |
| 2014/0204455 A1 | 7/2014 | Popovich et al. |
| 2014/0204465 A1 | 7/2014 | Yamaguchi |
| 2014/0226193 A1 | 8/2014 | Sun |
| 2014/0232651 A1 | 8/2014 | Kress et al. |
| 2014/0285429 A1 | 9/2014 | Simmons |
| 2014/0368896 A1 | 12/2014 | Nakazono et al. |
| 2015/0036221 A1 | 2/2015 | Stephenson |
| 2015/0156716 A1 | 6/2015 | Raffle et al. |
| 2015/0205126 A1 | 7/2015 | Schowengerdt |
| 2015/0205134 A1 | 7/2015 | Bailey et al. |
| 2015/0268821 A1 | 9/2015 | Ramsby et al. |
| 2015/0325202 A1 | 11/2015 | Lake et al. |
| 2015/0362734 A1 | 12/2015 | Moser et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2016/0033771 A1* | 2/2016 | Tremblay ........... G02B 27/0172 345/8 |
| 2016/0202081 A1 | 7/2016 | Debieuvre et al. |
| 2016/0238845 A1 | 8/2016 | Alexander et al. |
| 2016/0274365 A1 | 9/2016 | Bailey et al. |
| 2016/0274758 A1 | 9/2016 | Bailey |
| 2016/0313899 A1 | 10/2016 | Noel |
| 2016/0327796 A1 | 11/2016 | Bailey et al. |
| 2016/0327797 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0377866 A1* | 12/2016 | Alexander ........... G03H 1/2645 345/8 |
| 2016/0377886 A1* | 12/2016 | Quiroga ................ G02C 7/083 349/13 |
| 2017/0068095 A1 | 3/2017 | Holland et al. |
| 2017/0097753 A1 | 4/2017 | Bailey et al. |
| 2017/0115483 A1 | 4/2017 | Aleem et al. |
| 2017/0153701 A1 | 6/2017 | Mahon et al. |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0299956 A1 | 10/2017 | Holland et al. |

(56) References Cited

U.S. PATENT DOCUMENTS

| | | |
|---|---|---|
| 2017/0343796 A1 | 11/2017 | Bailey et al. |
| 2017/0343797 A1 | 11/2017 | Bailey et al. |
| 2018/0007255 A1 | 1/2018 | Tang |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2015/123775 A1 | 8/2012 |
| WO | 2014/155288 A2 | 10/2014 |

OTHER PUBLICATIONS

Amitai, "P-27: A Two-Dimensional Aperture Expander for Ultra-Compact, High-Performance Head-Worn Displays," *SID Symposium Digest of Technical Papers* 36(1):360-363, 2005.

Äyräs et al., "Exit pupil expander with a large field of view based on diffractive optics," *Journal of the SID* 17(8):659-664, 2009.

Chellappan et al., "Laser-based displays: a review," *Applied Optics* 49(25):F79-F98, 2010.

Cui et al., "Diffraction from angular multiplexing slanted volume hologram gratings," *Optik* 116:118-122, 2005.

Curatu et al., "Dual Purpose Lens for an Eye-Tracked Projection Head-Mounted Display," International Optical Design Conference 2006, *SPIE-OSA* 6342:63420X-1-63420X-7, 2007.

Curatu et al., "Projection-based head-mounted display with eye-tracking capabilities," *Proc. of SPIE* 5875:58750J-1-58750J-9, 2005.

Essex, "Tutorial on Optomechanical Beam Steering Mechanisms," OPTI 521 Tutorial, College of Optical Sciences, University of Arizona, 8 pages, 2006.

Fernández et al., "Optimization of a thick polyvinyl alcohol-acrylamide photopolymer for data storage using a combination of angular and peristrophic holographic multiplexing," *Applied Optics* 45(29):7661-7666, 2009.

Hainich et al., "Chapter 10: Near-Eye Displays," *Displays: Fundamentals & Applications*, AK Peters/CRC Press, 2011, 65 pages.

Hornstein et al., "Maradin's Micro-Mirror—System Level Synchronization Notes," SID 2012 Digest, pp. 981-984.

International Search Report, dated Jun. 8, 2016, for PCT/US2016/018293, 17 pages.

International Search Report, dated Jun. 8, 2016, for PCT/US2016/018298, 14 pages.

International Search Report, dated Jun. 8, 2016, for PCT/US2016/018299, 12 pages.

Itoh et al., "Interaction-Free Calibration for Optical See-Through Head-Mounted Displays based on 3D Eye Localization," 2014 IEEE Symposium on 3D User Interfaces (3DUI), pp. 75-82, 2014.

Kessler, "Optics of Near to Eye Displays (NEDs)," Presentation—Oasis 2013, Tel Aviv, Feb. 19, 2013, 37 pages.

Kress et al., "A review of head-mounted displays (HMD) technologies and applications for consumer electronics," *Proc. of SPIE* 8720:87200A-1-87200A-13, 2013.

Kress et al., "Diffractive and Holographic Optics as Optical Combiners in Head Mounted Displays," Proceedings of the 2013 ACM Conference on Pervasive and Ubiquitous Computing Adjunct Publication, pp. 1479-1482, 2013.

Kress, "Optical architectures for see-through wearable displays," Presentation—Bay Area—SID Seminar, Apr. 30, 2014, 156 pages.

Levola, "7.1: *Invited Paper*: Novel Diffractive Optical Components for Near to Eye Displays," *SID Symposium Digest of Technical Papers* 37(1):64-67, 2006.

Liao et al., "The Evolution of MEMS Displays," *IEEE Transactions on Industrial Electronics* 56(4):1057-1065, 2009.

Lippert, "Chapter 6: Display Devices: RSD™ (Retinal Scanning Display)," *The Avionics Handbook*, CRC Press, 2001, 8 pages.

Majaranta et al., "Chapter 3—Eye-Tracking and Eye-Based Human-Computer Interaction," in *Advances in Physiological Computing*, Springer-Verlag London, 2014, pp. 17-39.

Schowengerdt et al., "Stereoscopic retinal scanning laser display with integrated focus cues for ocular accommodation" *Proc. of SPIE-IS&T Electronic Imaging* 5291:366-376, 2004.

Silverman et al., "58.5L: *Late News Paper*: Engineering a Retinal Scanning Laser Display with Integrated Accommodative Depth Cues," SID 03 Digest, pp. 1538-1541, 2003.

Takatsuka et al., "Retinal projection display using diffractive optical element," Tenth International Conference on Intelligent Information Hiding and Multimedia Signal Processing, IEEE, 2014, pp. 403-406.

Urey et al., " Optical performance requirements for MEMS-scanner based microdisplays," Conf. on MOEMS and Miniaturized Systems, *SPIE* 4178:176-185, 2000.

Urey, "Diffractive exit-pupil expander for display applications," *Applied Optics* 40(32):5840-5851, 2001.

Viirre et al., "The Virtual Retinal Display: A New Technology for Virtual Reality and Augmented Vision in Medicine," *Proc. of Medicine Meets Virtual Reality*, IOS Press and Ohmsha, 1998, pp. 252-257. (6 pages).

International Search Report and Written Opinion, dated Dec. 8, 2016, for International Application No. PCT/US2016/050225, 15 pages.

International Search Report and Written Opinion, dated Jan. 18, 2017, for International Application No. PCT/US2016/054852, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Merriam-Webster, "Radio Frequencies" retrieved from https://www.merriam-webster.com/table/collegiate/radiofre.htm, retrieved on Jul. 12, 2017, 2 pages.

\* cited by examiner

SYSTEMS, DEVICES, AND METHODS FOR EYEBOX EXPANSION IN WEARABLE HEADS-UP DISPLAYS

BACKGROUND

Technical Field

The present systems, devices, and methods generally relate to scanning laser-based display technologies and particularly relate to expanding the eyebox of a scanning laser-based wearable heads-up display.

Description of the Related Art

Wearable Heads-UP Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus while still providing displayed content with sufficient visual quality. There is a need in the art for wearable heads-up displays of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A wearable heads-up display may be summarized as including: a support structure that in use is worn on a head of a user; a scanning laser projector carried by the support structure; a holographic combiner carried by the support structure, wherein the holographic combiner is positioned within a field of view of an eye of the user when the support structure is worn on the head of the user; and an optical replicator carried by the support structure and positioned in an optical path between the scanning laser projector and the holographic combiner, the optical replicator comprising at least one optical element arranged to receive a light signal generated by the scanning laser projector and redirect respective ones of N instances of the light signal towards the holographic combiner, where N is an integer greater than 1, and wherein the holographic combiner comprises at least one hologram positioned and oriented to redirect each one of the N instances of the light signal towards the eye of the user. The at least one hologram of the holographic combiner may redirect the N instances of the light signal all spatially in parallel with one another towards respective regions of the eye of the user. At least one optical element of the optical replicator may be arranged to redirect respective ones of the N instances of the light signal towards the holographic combiner effectively from respective ones of N spatially-separated virtual positions for the scanning laser projector.

The support structure may have a general shape and appearance of an eyeglasses frame. The wearable heads-up display may further include a prescription eyeglass lens, wherein the holographic combiner is carried by the prescription eyeglass lens.

The at least one hologram of the holographic combiner may converge each one of the N instances of the light signal to a respective one of N exit pupils at or proximate the eye of the user. The holographic combiner may include at least N multiplexed holograms, and each one of the at least N multiplexed holograms may converge a respective one of the N instances of the light signal to a respective one of the N exit pupils at or proximate the eye of the user. The scanning laser projector may include a red laser diode, a green laser diode, and a blue laser diode, and the holographic combiner may include a wavelength-multiplexed holographic combiner that includes at least one red hologram, at least one green hologram, and at least one blue hologram. In this case, the at least one red hologram may converge a respective red component of each one of the N instances of the light signal to a respective one of the N exit pupils at or proximate the eye of the user, the at least one green hologram may converge a respective green component of each one of the N instances of the light signal to a respective one of the N exit pupils at or proximate the eye of the user, and the at least one blue hologram may converge a respective blue component of each one of the N instances of the light signal to a respective one of the N exit pupils at or proximate the eye of the user. The holographic combiner may include a wavelength-multiplexed and angle-multiplexed holographic combiner that includes at least N angle-multiplexed red holograms, at least N angle-multiplexed green holograms, and at least N angle-multiplexed blue holograms, and each one of the at least N angle-multiplexed red holograms may converge a respective red component of each one of the N instances of the light signal to a respective one of the N exit pupils at or proximate the eye of the user, each one of the at least N angle-multiplexed green holograms may converge a respective green component of each one of the N instances of the light signal to a respective one of the N exit pupils at or proximate the eye of the user, and each one of the at least N angle-multiplexed blue holograms may converge a respective blue component of each one of the N instances of the light signal to a respective one of the N exit pupils at or proximate the eye of the user.

The optical path between the scanning laser projector and the holographic combiner may include a total scan range $\theta$ of the scanning laser projector, and at least one optical element of the optical replicator may be arranged to receive all light signals corresponding to a sweep of the total scan range $\theta$ by the scanning laser projector and redirect respective ones of N instances of all light signals corresponding to the sweep of the total scan range $\theta$ of the scanning laser projector towards the holographic combiner.

The light signal may include an image comprising at least two pixels, and each one of the N instances of the light signal may include a respective instance of the image. Alternatively, each one of the N instances of the light signal includes a respective instance of a same pixel in a different instance of a same image.

The wearable heads-up display may further include: an eye tracker carried by the support structure, positioned and oriented to determine a gaze direction of the eye of the user; and at least one controllable shutter carried by the support structure and positioned in at least one optical path between the optical replicator and the holographic combiner, the at least one controllable shutter controllable to selectively block all but at least one of the N instances of the light signal redirected towards the holographic combiner by the optical replicator, the at least one of the N instances of the light signal that is not blocked by the at least one controllable shutter corresponding to the at least one of the N instances of the light signal that, when redirected by the holographic combiner, is redirected by the holographic combiner towards a region of the eye of the user that contains a pupil of the eye of the user based on the gaze direction of the eye of the user determined by the eye tracker.

A method of operating a wearable heads-up display, the wearable heads-up display including a scanning laser projector, an optical replicator, and a holographic combiner positioned within a field of view of an eye of a user when the wearable heads-up display is worn on a head of the user, may be summarized as including: generating a first light signal by the scanning laser projector; redirecting respective ones of N instances of the first light signal towards the holographic combiner by the optical replicator, where N is an integer greater than 1; and redirecting each instance of the first light signal that is received from the optical replicator towards the eye of the user by the holographic combiner. The method may further include: receiving the first light signal from the scanning laser projector by the optical replicator; and replicating the first light signal into the N instances of the first light signal by the optical replicator. Redirecting each instance of the first light signal that is received from the optical replicator towards the eye of the user by the holographic combiner may include redirecting each instance of the first light signal that is received from the optical replicator spatially in parallel with one another towards respective regions of the eye of the user by the holographic combiner. Redirecting respective ones of N instances of the first light signal towards the holographic combiner by the optical replicator may include redirecting respective ones of N instances of the first light signal towards the holographic combiner by the optical replicator effectively from respective ones of N spatially-separated virtual positions for the scanning laser projector.

Redirecting each instance of the first light signal that is received from the optical replicator towards the eye of the user by the holographic combiner may include converging each instance of the first light signal that is received from the optical replicator to a respective exit pupil at or proximate the eye of the user by the holographic combiner. The holographic combiner may include at least two multiplexed holograms, and converging each instance of the first light signal that is received from the optical replicator to a respective exit pupil at or proximate the eye of the user by the holographic combiner may include converging each instance of the first light signal that is received from the optical replicator to a respective exit pupil at or proximate the eye of the user by a respective multiplexed hologram.

The scanning laser projector may include a red laser diode, a green laser diode, and a blue laser diode; the first light signal generated by the scanning laser projector may include a red component, a green component, and a blue component; and the holographic combiner may include a wavelength-multiplexed holographic combiner that includes at least one red hologram, at least one green hologram, and at least one blue hologram. In this case, converging each instance of the first light signal that is received from the optical replicator to a respective exit pupil at or proximate the eye of the user by a respective multiplexed hologram may include: converging a respective red component of each instance of the first light signal that is received from the optical replicator to a respective exit pupil at or proximate the eye of the user by the at least one red hologram; converging a respective green component of each instance of the first light signal that is received from the optical replicator to a respective exit pupil at or proximate the eye of the user by the at least one green hologram; and converging a respective blue component of each instance of the first light signal that is received from the optical replicator to a respective exit pupil at or proximate the eye of the user by the at least one blue hologram. The holographic combiner may include a wavelength-multiplexed and angle-multiplexed holographic combiner that includes at least two angle-multiplexed red holograms, at least two angle-multiplexed green holograms, and at least two angle-multiplexed blue holograms. In this case, converging a respective red component of each instance of the first light signal that is received from the optical replicator to a respective exit pupil at or proximate the eye of the user by the at least one red hologram may include converging a respective red component of each instance of the first light signal that is received from the optical replicator to a respective exit pupil at or proximate the eye of the user by a respective angle-multiplexed red hologram; converging a respective green component of each instance of the first light signal that is received from the optical replicator to a respective exit pupil at or proximate the eye of the user by the at least one green hologram may include converging a respective green component of each instance of the first light signal that is received from the optical replicator to a respective exit pupil at or proximate the eye of the user by a respective angle-multiplexed green hologram; and converging a respective blue component of each instance of the first light signal that is received from the optical replicator to a respective exit pupil at or proximate the eye of the user by the at least one blue hologram may include converging a respective blue component of each instance of the first light signal that is received from the optical replicator to a respective exit pupil at or proximate the eye of the user by a respective angle-multiplexed blue hologram.

The method may further include: generating at least a second light signal by the scanning laser projector; redirecting respective ones of N instances of the at least a second light signal towards the holographic combiner by the optical replicator; and converging each instance of the at least a second light signal that is received from the optical replicator to a respective exit pupil at or proximate the eye of the user by the holographic combiner.

The method may further include: generating light signals corresponding to a sweep of a total scan range θ by the scanning laser projector; receiving the light signals corresponding to the total scan range θ of the scanning laser projector by the optical replicator; redirecting respective ones of N instances of the total scan range θ of the scanning laser projector towards the holographic combiner by the optical replicator; and converging each instance of the total scan range θ of the scanning laser projector that is received from the optical replicator to a respective exit pupil at or proximate the eye of the user by the holographic combiner.

The wearable heads-up display may further include an eye tracker and at least one controllable shutter and the method further include: determining a gaze direction of the eye of the user by the eye tracker; and selectively blocking all but at least one of the N instances of the light signal redirected towards the holographic combiner from the optical replicator by the at least one controllable shutter. In this case, redirecting each instance of the first light signal that is received from the optical replicator towards the eye of the user by the holographic combiner may include, for the at least one of the N instances of the first light signal that is not blocked by the at least one controllable shutter, redirecting, by the holographic combiner, the at least one of the N instances of the first light signal towards a region of the eye of the user that contains a pupil of the eye of the user based on the gaze direction of the eye of the user determined by the eye tracker.

The first light signal may include an image comprising at least two pixels and redirecting respective ones of N instances of the first light signal towards the holographic combiner by the optical replicator may include redirecting N respective instances of a same image towards the holographic combiner by the optical replicator.

Redirecting respective ones of N instances of the first light signal towards the holographic combiner by the optical replicator may include redirecting N respective instances of a same pixel in a different instance of a same image towards the holographic combiner by the optical replicator.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
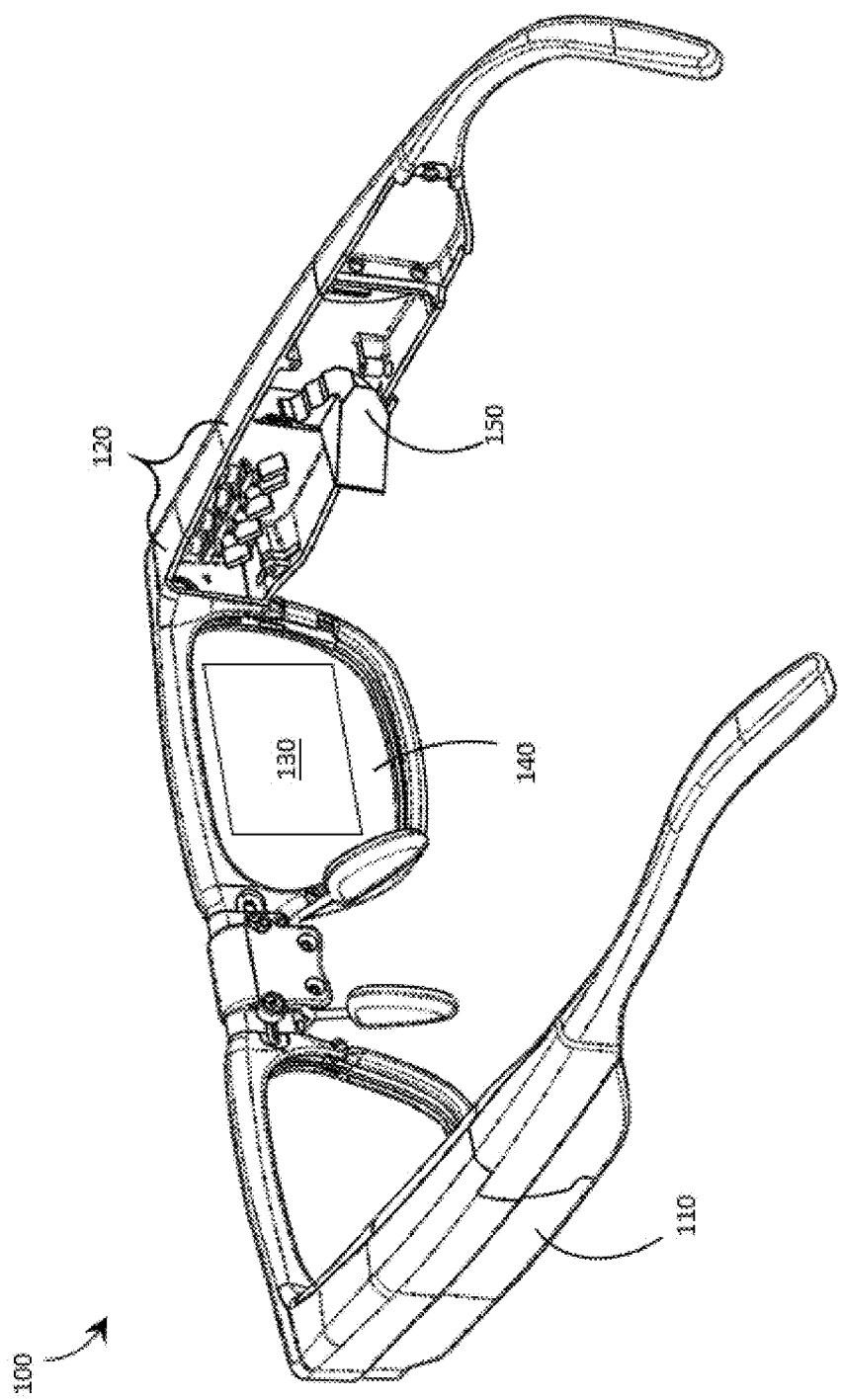
FIG. 1 is a partial-cutaway perspective view of a wearable heads-up display that provides a large eyebox made up of multiple optically-replicated exit pupils in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for eyebox expansion in scanning laser-based wearable heads-up displays ("WHUDs"). Generally, a scanning laser-based WHUD is a form of virtual retina display in which a scanning laser projector ("SLP") draws a raster scan onto the eye of the user. In the absence of any further measure the SLP projects light over a fixed area called the exit pupil of the display. In order for the user to see displayed content the exit pupil typically needs to align with, be encompassed by, or overlap with the entrance pupil of the user's eye. The full scan range of the SLP (i.e., the full resolution and/or field of view of the display) is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead, but the eye's pupil may quickly leave the eyebox if and when the user glances anywhere off-center. A larger eyebox may be achieved by increasing the size of the exit pupil but this typically comes at the cost of reducing the display resolution and/or field of view. In accordance with the present systems, devices, and methods, the eyebox of a scanning laser-based WHUD may be expanded by optically replicating a relatively small exit pupil and spatially distributing multiple copies or instances of the exit pupil over a relatively larger area of the user's eye, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In other words, the present systems, devices, and methods describe eyebox expansion by exit pupil replication in scanning laser-based WHUDs.

Throughout this specification and the appended claims, the term "replication" is used (e.g., in the context of "exit pupil replication") to generally refer to situations where multiple instances of substantially the same thing (e.g., an exit pupil) are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil.

FIG. 1 is a partial-cutaway perspective view of a WHUD 100 that provides a large eyebox made up of multiple optically-replicated exit pupils in accordance with the present systems, devices, and methods. WHUD 100 includes a support structure 110 that in use is worn on the head of a user and has a general shape and appearance of an eyeglasses (e.g., sunglasses) frame. Support structure 110 carries multiple components, including: a SLP 120, a holographic combiner 130, and an optical replicator 150. Portions of SLP 120 and optical replicator 150 may be contained within an inner volume of support structure 110; however, FIG. 1 provides a partial-cutaway view in which regions of support structure 110 have been removed in order to render visible portions of SLP 120 and optical replicator 150 that may otherwise be concealed.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor and a non-transitory processor-readable storage medium or memory storing processor-executable data and/or instructions that, when executed by the processor, cause the processor to control the operation of SLP 120. For ease of illustration, FIG. 1 does not call out a processor or a memory.

Holographic combiner 130 is positioned within a field of view of at least one eye of the user when support structure 110 is worn on the head of the user. Holographic combiner 130 is sufficiently optically transparent to permit light from the user's environment (i.e., "environmental light") to pass through to the user's eye. In the illustrated example of FIG. 1, support structure 110 further carries a transparent eyeglass lens 140 (e.g., a prescription eyeglass lens) and holographic combiner 130 comprises at least one layer of holographic material that is adhered to, affixed to, laminated with, carried in or upon, or otherwise integrated with eyeglass lens 140. The at least one layer of holographic material may include a photopolymer film such as Bayfol®HX available from Bayer MaterialScience AG or a silver halide compound and may, for example, be integrated with transparent lens 140 using any of the techniques described in U.S. Provisional Patent Application Ser. No. 62/214,600. Holographic combiner 130 includes at least one hologram in or on the at least one layer of holographic material. With holographic combiner 130 positioned in a field of view of an eye of the user when support structure 110 is worn on the head of the user, the at least one hologram of holographic combiner 130 is positioned and oriented to redirect light originating from SLP 120 towards the eye of the user. In particular, the at least one hologram is positioned and oriented to receive light signals that originate from SLP 120 and converge those light signals to at least one exit pupil at or proximate the eye of the user.

Optical replicator 150 is positioned in an optical path between SLP 120 and holographic combiner 130. Optical replicator 150 comprises at least one optical element (e.g., at least one lens, reflector, partial reflector, prism, diffractor, diffraction grating, mirror, or other optical element, or at least one configuration, combination, and/or arrangement of such) that is arranged to receive light signals generated and output by SLP 120, produce multiple (e.g., N, where N is an integer greater than 1) copies or instances of the light signals, and redirect respective ones of the N instances of the light signals towards holographic combiner 130. Advantageously, optical replicator 150 may be a static and passive component that, without power consumption or any moving parts, receives as an input a light signal generated by SLP 120 and provides as outputs N replicated instances of that light signal, the N replicated instances of the light signal temporally substantially in parallel with one another and, as will be described in more detail later on, spatially separated from one another so that each one of the N instances appears to originate (i.e., "effectively" originates) from a respective one of N different spatially-separated "virtual positions" for SLP 120 as opposed to appearing to originate from the real position for SLP 120.

Throughout this specification and the appended claims, reference is often made to one or more "virtual position(s)" such as "N spatially-separated virtual positions for a SLP." The "real position" of an object is its actual position in real, three dimensional space. A "virtual position" of an object is a position in real space at which the optics of a system cause light from the object to effectively originate even though the real position of the object may be elsewhere. In other words, the optics of the system cause light from the object to follow optical paths that would trace back, if the optics of the system were ignored during the trace back, to a "virtual position" in space that is spatially-separated from the object's "real position" in space. As a simple example, an object in front of a planar mirror has a "virtual position" on the other side of the planar mirror. A "virtual position" may be a result of one or more intervening optical element(s) in an optical path. When one or more optical element(s) redirects light signals from a SLP, a virtual position for the SLP refers to the position in real space at which the SLP would need to be located in order to provide light signals having that same trajectory without any intervening optics. The optics of the system cause the light signals to follow a trajectory that would correspond to a different point of origin if there were no such optics in the system. The light signals appear to have "effectively" originated from a different, or "virtual," position for the SLP.

Figure 2A:
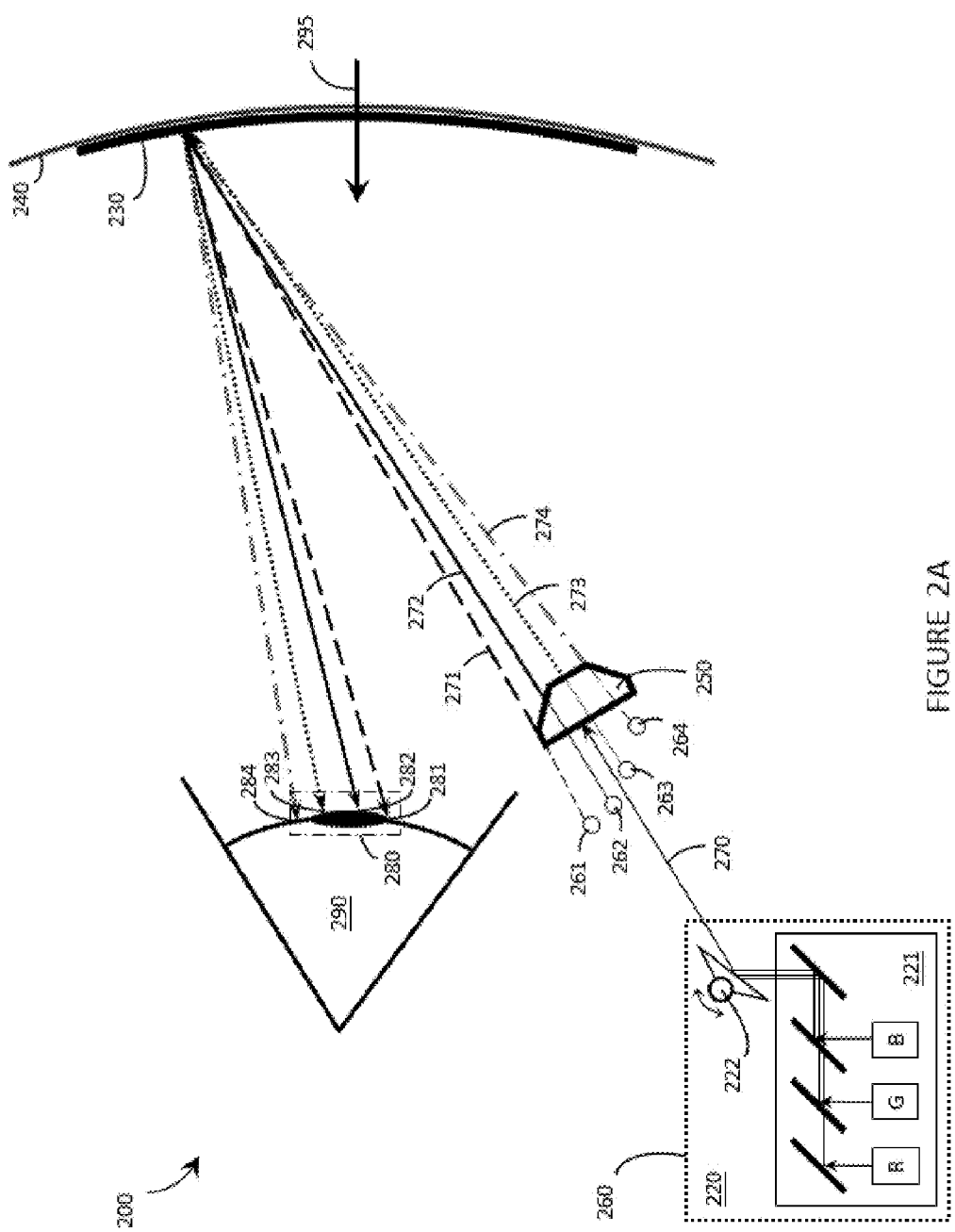
FIG. 2A is an illustrative diagram of a wearable heads-up display in operation showing eyebox expansion by exit pupil replication in accordance with the present systems, devices, and methods.

FIG. 2A is an illustrative diagram of a WHUD 200 in operation showing eyebox expansion by exit pupil replication in accordance with the present systems, devices, and methods. WHUD 200 may be substantially similar to WHUD 100 from FIG. 1, although in FIG. 2A no support structure (e.g., support structure 110) is illustrated in order to reduce clutter. As with WHUD 100, WHUD 200 comprises a SLP 220 (which includes a RGB laser module 221 and at least one MEMS-based scan mirror 222), a holographic combiner 230 carried by an eyeglass lens 240, and the optical replicator 250. As previously described, the combination of holographic combiner 230 and eyeglass lens 240 is sufficiently transparent to allow environmental light 295 to pass through to the eye 290 of the user.

SLP 220 is located at a first position 260 (i.e., a "real" position) relative to holographic combiner 230 and is shown generating (e.g., projecting) a first light signal 270. Optical replicator 250 is positioned in an optical path between SLP 220 and holographic combiner 230 such that optical replicator 250 interrupts (e.g., receives) light signal 270 en route from SLP 220 to holographic combiner 230. As previously described, optical replicator 250 includes at least one optical element (e.g., at least one lens, reflector, partial reflector, prism, diffractor, diffraction grating, mirror, or other optical element, or at least one configuration, combination, and/or arrangement of such) that is arranged to receive light signal 270 from SLP 220 and redirect respective ones of N instances of light signal 270 towards holographic combiner 230. In the illustrated example of FIG. 2A, optical replicator 250 redirects four instances (i.e., N=4) of light signal 270 towards holographic combiner 230: instance 271 of light signal 270 represented by lines with large dashes, instance 272 of light signal 270 represented by solid lines, instance 273 of light signal 270 represented by dotted lines, and instance 274 of light signal 270 represented by lines having alternating large and short dashes. Four instances of light signal 270 (i.e., N=4) are used as an example for illustrative purposes only in FIG. 2A. In alternative implementations any number of instances of a light signal may be produced by an optical replicator in accordance with the present systems, devices, and methods (e.g., N may be any integer greater than 1 depending on the specific implementation).

SLP 220 is positioned at a first real position 260 in real space relative to holographic combiner 230. Optical replicator 250 (e.g., at least one optical element thereof) is arranged to redirect respective ones of the N=4 instances 271, 272, 273, and 274 of light signal 270 towards holographic combiner 230 effectively from respective ones of N=4 spatially-separated virtual positions 261, 262, 263, and 264 for SLP 220. Specifically, optical replicator redirects (e.g., is arranged to redirect) first instance 271 of light signal 270 towards holographic combiner 230 effectively from first virtual position 261 for SLP 220, second instance 272 of light signal 270 towards holographic combiner 230 effectively from second virtual position 262 for SLP 220, third instance 273 of light signal 270 towards holographic combiner 230 effectively from third virtual position 263 for SLP 220, and fourth instance 274 of light signal 270 towards holographic combiner 230 effectively from fourth virtual position 264 for SLP 220. Each respective one of the N=4 virtual positions 261, 262, 263, and 264 for SLP 220 effectively established by optical replicator 250 is spatially-separated from the other ones of the N=4 virtual positions 261, 262, 263, and 264 for SLP 220 so that each respective instance 271, 272, 273, and 274 of light signal 270 effectively impinges on holographic combiner 230 from a different position in space. Advantageously, each of the N=4 virtual positions 261, 262, 263, and 264 for SLP 220 may correspond to a respective position and orientation of SLP 220. In other words, relative to the other ones of the N=4 virtual positions 261, 262, 263, and 264 for SLP 220, each one of the virtual positions 261, 262, 263, and 264 may correspond to a respective displacement and rotation of SLP 220. Such is the case in WHUD 200 for which, as would be apparent to one of ordinary skill in the art, a line connecting each of the N=4 virtual positions 261, 262, 263, and 264 for SLP 220 in FIG. 2A would be a curved line.

Each one of the N=4 instances 271, 272, 273, and 274 of light signal 270 is output by optical replicator 250 and received by holographic combiner 230. As previously described, holographic combiner 230 includes at least one hologram that is operative (e.g., designed, crafted, encoded, recorded, and/or generally positioned and oriented) to redirect each one of the N=4 instances 271, 272, 273, and 274 of light signal 270 towards eye 290 of the user. Advantageously, the at least one hologram of holographic combiner 230 may converge each one of the N=4 instances 271, 272, 273, and 274 of light signal 270 to a respective one of N=4 exit pupils 281, 282, 283, and 284 at or proximate eye 290 of the user. Specifically: optical replicator 250 directs first instance 271 of light signal 270 towards holographic combiner 230 effectively from first virtual position 261 for SLP 220 and holographic combiner 230 converges first instance 271 of light signal 270 to first exit pupil 281 at or proximate eye 290; optical replicator 250 directs second instance 272 of light signal 270 towards holographic combiner 230 effectively from second virtual position 262 for SLP 220 and holographic combiner 230 converges second instance 272 of light signal 270 to second exit pupil 282 at or proximate eye 290; optical replicator 250 directs third instance 273 of light signal 270 towards holographic combiner 230 effectively from third virtual position 263 for SLP 220 and holographic combiner 230 converges third instance 273 of light signal 270 to third exit pupil 283 at or proximate eye 290; and optical replicator 250 directs fourth instance 274 of light signal 270 towards holographic combiner 230 effectively from fourth virtual position 264 for SLP 220 and holographic combiner 230 converges fourth instance 274 of light signal 270 to fourth exit pupil 284 at or proximate eye 290. The eyebox 280 of WHUD 200 is given by the total range of pupil positions (or gaze directions) for eye 290 in which at least one of exit pupils 281 282, 283, and/or 284 aligns with and/or impinges on the pupil of eye 290. Without optical replicator 250, a single instance of light signal 270 (e.g., second instance 272) would impinge on eye 290 at a single exit pupil (e.g., second exit pupil 282) to provide a relatively small eyebox. In such a configuration, displayed content would disappear from the user's point of view if and when the user gazed in a direction that caused the pupil of eye 290 to move away from the single exit pupil (e.g., second exit pupil 282). In accordance with the present systems, devices, and methods, optical replicator 250 replicates light signal 270 to produce N=4 (where 4 is an illustrative example) instances 271, 272, 273, and 274 of light signal 270 and because each of these four instances 271, 272, 273, and 274 effectively originates from a different spatially-separated virtual position 261, 262, 263, and 264, respectively, for SLP 220, holographic combiner 230 converges each of these four instances 271, 272, 273, and 274 to a respective spatially-separated exit pupil 281, 282, 283, and 284 at or proximate eye 290. Spatially-separated exit pupils 281, 282, 283, and 284 are distributed over an area of eye 290 that covers a wider range of pupil positions (e.g., gaze directions) than a single exit pupil (of the same size as any one of exit pupils 281, 282, 283 and 284) on its own. Thus, eyebox 280 is expanded by exit pupil replication in WHUD 200.

Generally, first light signal 270 shown in FIG. 2A may embody a variety of different forms, including without limitation: a single light signal, a single pixel of an image, multiple pixels of an image, or an image itself that comprises at least two pixels. When first light signal 270 corresponds to an image (e.g., comprising at least two pixels), each one of the N=4 instances 271, 272, 273, and 274 of first light signal 270 produced by optical replicator 250 may include a respective instance of the same image. When first light signal 270 corresponds to one or more pixel(s) of an image, each one of the N=4 instances 271, 272, 273, and 274 of first light signal 270 may include a respective instance of the same one or more pixel(s) in a different instance of the same image.

Figure 2B:
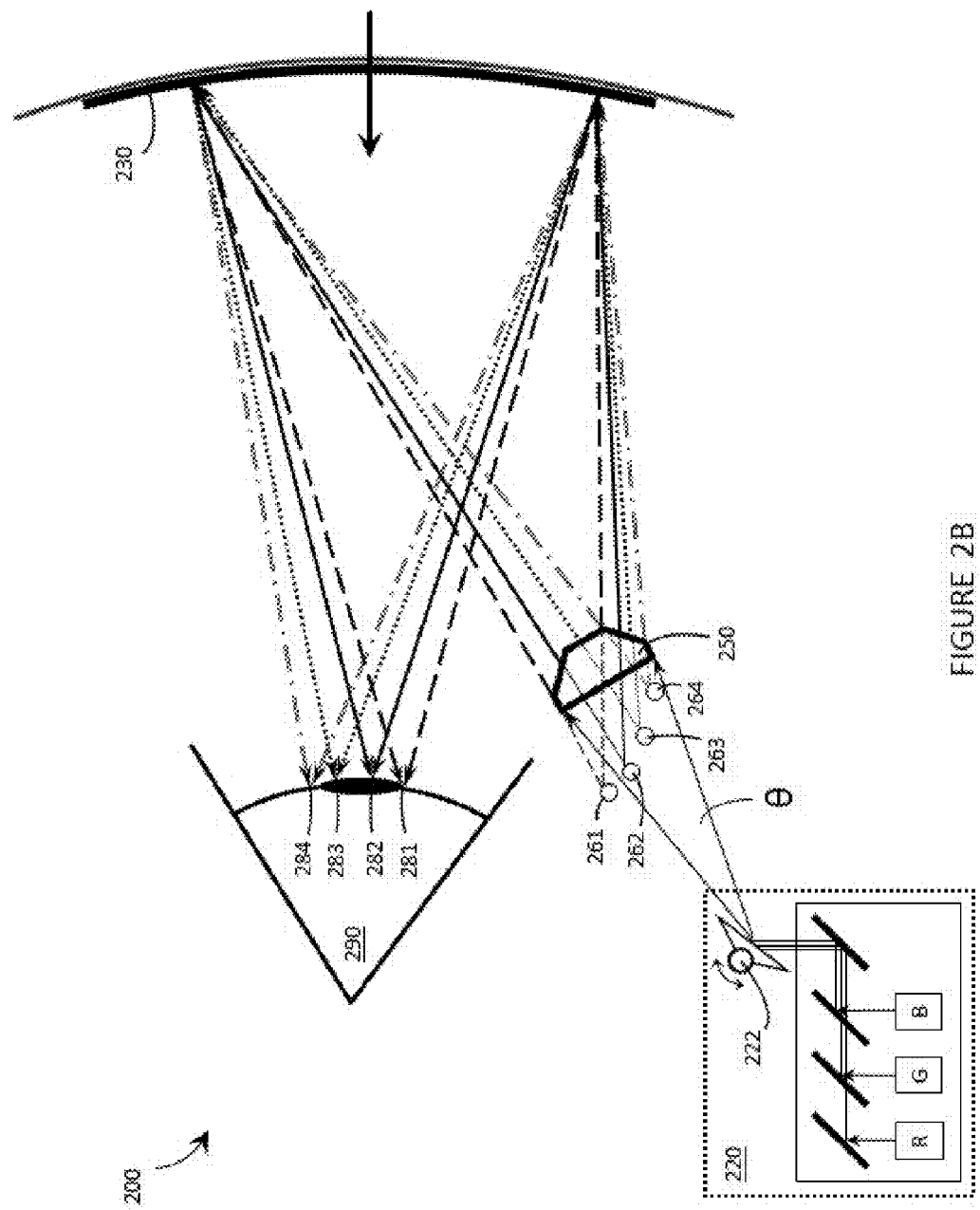
FIG. 2B is an illustrative diagram of the wearable heads-up display from FIG. 2A showing eyebox expansion by exit pupil replication for a sweep of the total scan range θ of the scanning laser projector in accordance with the present systems, devices, and methods.

FIG. 2B is an illustrative diagram of WHUD 200 from FIG. 2A showing eyebox expansion by exit pupil replication for a sweep of the total scan range $\theta$ of SLP 220 in accordance with the present systems, devices, and methods. FIG. 2B shows a different stage of operation of the same WHUD 200 from FIG. 2A. Many of the same elements from FIG. 2A are also included in FIG. 2B but only those elements that are particular to the description of FIG. 2B that follows are called out in FIG. 2B.

In the operation of WHUD 200 depicted in FIG. 2B, SLP 220 sweeps through its total scan range $\theta$. Throughout this specification and the appended claims, the "total scan range" of a SLP refers to the full range of angles and/or directions at which the SLP is operative to project light signals during normal use and is generally determined by the range of motion of the at least one scan mirror 222 in the SLP 220. The SLPs described herein are generally operative to draw a raster scan and the "total scan range" generally encompasses the outer perimeter of the full raster scan that the SLP is operative to draw. This may be accomplished by, for example, a SLP that employs a single scan mirror operative to scan in two orthogonal dimensions or two separate scan mirrors that are each operative to scan in a respective one of two orthogonal dimensions. An exemplary SLP may have a total scan range $\theta$ comprising a first scan range in a first dimension (e.g., in a horizontal dimension) and a second scan range in a second dimension (e.g., in a vertical dimension). The first and second scan ranges may each be between 0° and 180°, although in practice each may be within a narrower range, such as between 10° and 60°. The relative scan ranges in the first and second dimensions influence the aspect ratio of the WHUD.

Optical replicator 250 of WHUD 200 is positioned in the optical path (e.g., in all the optical paths) between SLP 220 and holographic combiner 230 for the total scan range $\theta$ of SLP 220. At least one optical element of optical replicator 250 is arranged to receive all of the light signals (e.g., a single optical element may be arranged to receive all of the light signals or multiple optical elements may arranged to all receive all of the light signals, or multiple optical elements may be arranged so that each light signal is received by at least one of the multiple optical elements) generated by SLP 220 during a sweep of the total scan range $\theta$ by SLP 220 and redirect respective ones of N (e.g., N=4 in the illustrated example) instances of all of the light signals towards holographic combiner 230. In other words, in a similar way to how a first light signal 270 is replicated by optical replicator 250 as four instances 271, 272, 273, and 274 of the first light signal 270 in the exemplary operation of WHUD 200 illustrated in FIG. 2A, FIG. 2B illustrates an exemplary operation of WHUD 200 in which all light signals corresponding to a first sweep of the total scan range $\theta$ of SLP 220 are replicated by optical replicator 250 as four instances of all light signals corresponding to the sweep of the total scan range θ of SLP 220. The four instances of all light signals corresponding to the total scan range θ are not called out in FIG. 2B to reduce clutter but are drawn using the same distinguishable lines as used to distinguish between the different instances 271, 272, 273, and 274 of first light signal 270 in FIG. 2A. That is, a first instance of all light signals corresponding to the sweep of the total scan range θ (represented by lines with large dashes) is redirected by optical replicator 250 towards holographic combiner 230 from first virtual position 261 for SLP 220, a second instance of all light signals corresponding to the sweep of the total scan range θ (represented by solid lines) is redirected by optical replicator 250 towards holographic combiner 230 from second virtual position 262 for SLP 220, a third instance of all light signals corresponding to the sweep of the total scan range θ (represented by dotted lines) is redirected by optical replicator 250 towards holographic combiner 230 from third virtual position 263 for SLP 220, and a fourth instance of all light signals corresponding to the sweep of the total scan range θ (represented by lines with alternating large and short dashes) is redirected by optical replicator 250 towards holographic combiner 230 from fourth virtual position 264 for SLP 220. At least one hologram of holographic combiner 230 receives the N=4 instances of all light signals corresponding to the sweep of the total scan range θ of SLP 220 and converges each respective instance of all light signals corresponding to the sweep of the total scan range θ of SLP 220 to a respective one of the N=4 exit pupils 281, 282, 283, and 284 at or proximate eye 290.

In FIG. 2A, the N=4 instances 271, 272, 273, and 274 of first light signal 270 are all shown incident at or on about the same region of holographic combiner 230. Likewise, in FIG. 2B the N=4 instances of all light signals corresponding to the sweep of the total scan range θ of SLP 220 are all shown incident over the same completely-overlapping area of holographic combiner 230. In both cases, this configuration is exemplary and in practice alternative configurations may be preferred depending on the specific implementation. Generally, each instance of all light signals corresponding to a sweep of the total scan range θ of SLP 220 may be incident upon (and received by) a respective region or area of holographic combiner 230 and these respective areas of holographic combiner 230 may or may not completely overlap (e.g., such areas may partially overlap or correspond to separate, non-overlapping areas).

In a virtual retina display such as scanning laser-based WHUD 100 and/or scanning laser-based WHUD 200, there may not be an "image" formed outside of the eye of the user. There is typically no microdisplay or projection screen or other place where the projected image is visible to a third party; rather, the image may be formed completely within the eye of the user. For this reason, it may be advantageous for a scanning laser-based WHUD to be designed to accommodate the manner in which the eye forms an image.

For a light signal entering the eye (e.g., a light ray, a wavefront, an incident beam from a SLP, or similar), the eye (or more accurately, the combination of the eye and the human brain) may determine "where" the light signal is positioned in the user's field of view based on the region of the retina that is illuminated by the light signal. Two light signals that illuminate the same region of the retina may appear in the same position in the user's field of view. The particular region of the retina that is illuminated by any given light signal is determined by the angle and not the location at which the light signal enters the eye. Thus, two light signals may appear in the same position in the user's field of view even if they enter different location of the user's pupil provided that the two light signals have the same angle of incidence when they enter the user's eye. The geometry of the eye's lens is such that any two light signals entering the eye at the same angle, regardless of the position/location at which the light signals enter the eye, may generally be directed to the same region of the retina and so may generally appear in the same position in the user's field of view.

In at least some implementations, the scanning laser-based WHUDs described herein project multiple instances of the same image onto the retina of the eye substantially concurrently. Even if the multiple instances are temporally-separated, the temporal separation may be small enough to be undetectable by the user. If any two of the multiple instances of the same image do not align/overlap on the eye's retina then those two instances of the image may not align/overlap in the user's field of view and undesirable effects such as ghosting can occur. In order to ensure that multiple instances of the same image (each corresponding to a respective exit pupil) align/overlap on the retina so that multiple instances of the image align/overlap in the user's field of view, a scanning laser-based WHUD may advantageously be configured to direct multiple instances of any given light signal (each corresponding to a respective exit pupil and each representing a respective instance of the same display content) towards the eye spatially in parallel with one another. More specifically and referring to FIG. 2A, the optical replicator 250 and/or the holographic combiner 230 may be configured (either individually or in combination) so that the holographic combiner 230 redirects the N=4 instances 271, 272, 273, and 274 of the first light signal 270 all spatially in parallel with one another towards respective regions (i.e., towards respective ones of N=4 spatially-separated exit pupils 281, 282, 283, and 284 from FIG. 2B) of the eye 290 of the user.

Figure 2C:
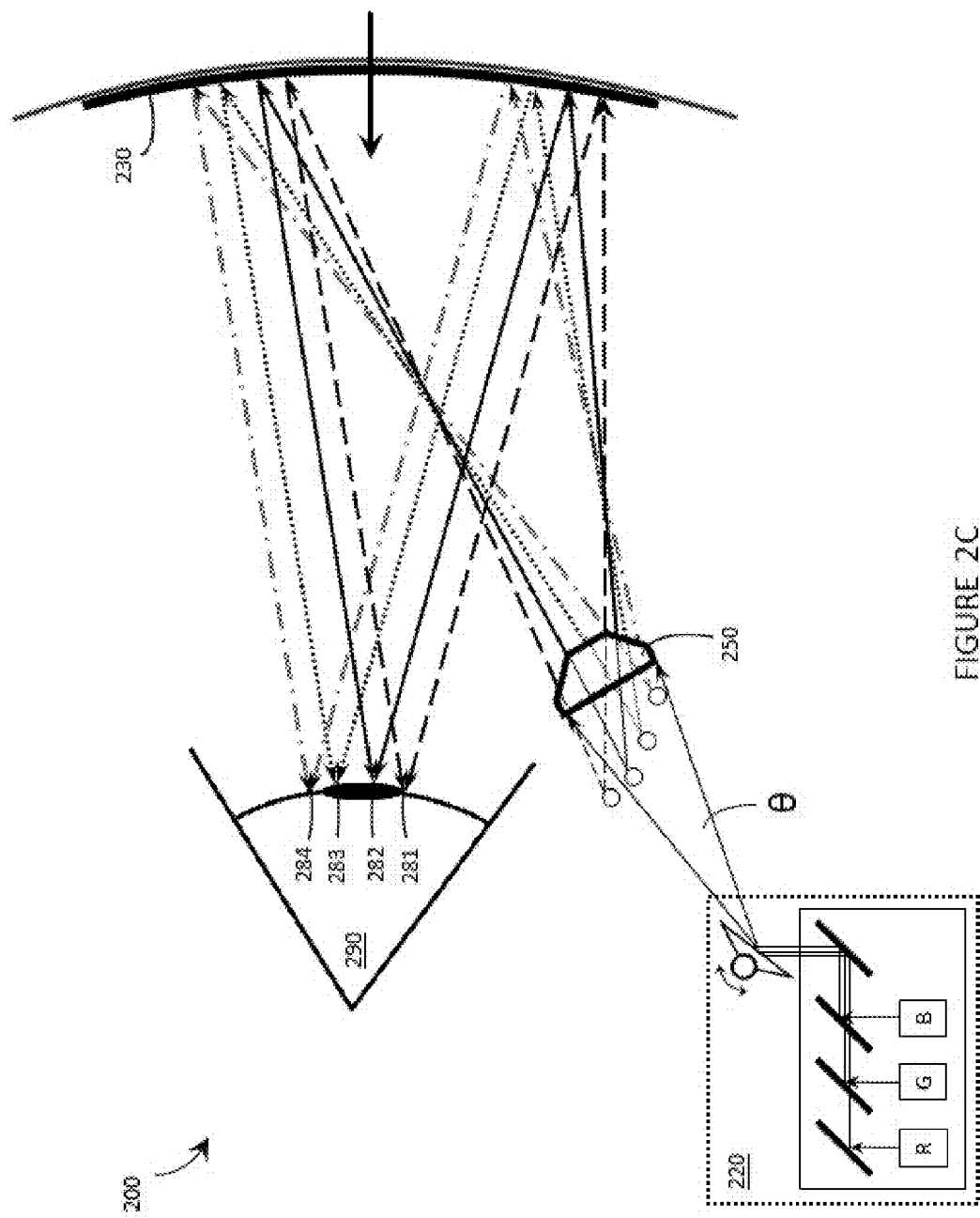
FIG. 2C is an illustrative diagram of the wearable heads-up display from FIGS. 2A and 2B showing eyebox expansion by exit pupil replication with respective instances of the same display content projected spatially in parallel with one another towards respective exit pupils in accordance with the present systems, devices, and methods.

FIG. 2C is an illustrative diagram of WHUD 200 from FIGS. 2A and 2B showing eyebox expansion by exit pupil replication with respective instances of the same display content (e.g., pixel(s)) projected spatially in parallel with one another towards respective exit pupils in accordance with the present systems, devices, and methods. In order to highlight some of the features shown in the implementation of FIG. 2C, the corresponding aspects of FIG. 2B will first be noted.

In the implementation of FIG. 2B, respective ones of the N=4 instances of all light signals corresponding to a sweep of the total scan range θ of SLP 220 all align with one another and completely overlap on holographic combiner 230. As a result, each of the N=4 exit pupils 281, 282, 283, and 284 converges at or proximate eye 290 from substantially the same area of holographic combiner 230. Because each of the N=4 exit pupils 281, 282, 283, and 284 originates from substantially the same area of holographic combiner 230 but converges to a respective spatially-separated region of eye 290, each of the N=4 exit pupils 281, 282, 283, and 284 necessarily includes at least some light signals having incident angles (at eye 290) that cannot be provided by at least one other one of the N=4 exit pupils 281, 282, 283, and 284. For example, the light signals (represented by lines with large dashes) that converge to exit pupil 281 include at least some angles of incidence that are not included in the light signals (represented by solid lines) that converge to exit pupil 282, and vice versa. As previously described, the angle of incidence of a light signal as it enters the eye determines where in the user's field of view the light (or the pixel of an image embodied by the light signal) will appear. A light signal having an angle of incidence that is unique to one exit pupil can only be projected to a user when that exit pupil aligns with the user's pupil (e.g., when the user's gaze direction includes that exit pupil). Thus, when multiple spatially-separated exit pupils all originate from substantially the same spatial area on holographic combiner 230, only a limited sub-region of that spatial area may be used to provide angles of incidence that are common to all of the exit pupils and, consequently, only a limited fraction of the total scan range θ of the SLP 220 may be used to provide uniform image replication across all of the spatially-separated exit pupils. Having all of the N=4 instances of the total scan range θ of SLP 220 align and overlap on holographic combiner 230 can simplify some aspects of the design of optical replicator 250 and/or holographic combiner 230 but can also limit the available resolution and/or field of view of SLP 220 that can be replicated across all exit pupils.

In the implementation of FIG. 2C, optical replicator 250 is modified (e.g., in geometry, orientation, and/or composition) to shift the relative trajectories of the N=4 instances of all light signals corresponding to a sweep of the total scan range θ of SLP 220 compared to their corresponding trajectories in the implementation of FIG. 2B. The N=4 instances of all light signals corresponding to a sweep of the total scan range θ of SLP 220 (respectively represented by different line types in FIG. 2C as in FIG. 2B) do not align or completely overlap on holographic combiner 230 in FIG. 2C as they do in FIG. 2B. Instead, the N=4 instances of the total scan range θ of SLP 220 are spatially distributed over the area of holographic combiner 230 and each positioned so that the respective corresponding light signals are all substantially parallel to one another when redirected and converged by holographic combiner 230 towards respective ones of the N=4 spatially-separated exit pupils 281, 282, 283, and 284 at or proximate eye 290. That is, the light signals that are converged by holographic combiner 230 to each respective one of the N=4 exit pupils 281, 282, 283, and 284 all include the same angles of reflection from holographic combiner 230 and accordingly the same angles of incidence with respect to eye 290. In contrast to the implementation of FIG. 2B, in the implementation of FIG. 2C none of the N=4 exit pupils 281, 282, 283, and 284 includes a light signal having an angle of incidence (with respect to eye 290, or an angle of reflection with respect to holographic combiner 230) that is not also included in each of the other ones of the N=4 exit pupils 281, 282, 283, and 284. Each of the N=4 exit pupils 281, 282, 283, and 284 of the implementation in FIG. 2C includes the entire scan range θ of SLP 220 and therefore the implementation of WHUD 200 depicted in FIG. 2C can provide uniform image replication across multiple exit pupils with larger field of view and/or higher resolution than the implementation of WHUD 200 depicted in FIG. 2B, at the cost of added complexity in optical replicator 250 and/or holographic combiner 230.

As previously described, holographic combiner 230 comprises at least one hologram embedded, encoded, recorded, or otherwise carried by at least one layer of holographic film. The holographic film may include, as examples, a photopolymer film such as Bayfol®HX from Bayer MaterialScience AG or a silver halide compound. The nature of the at least one hologram may depend on the specific implementation.

As a first example, holographic combiner 230 may include a single hologram that effectively operates as a fast-converging (e.g., convergence within about 1 cm, convergence with about 2 cm, or convergence within about 3 cm) mirror for light having the wavelength(s) provided by SLP 220. In this first example, the holographic film that carries the first hologram may have a relatively wide bandwidth, meaning the hologram recorded in the holographic film may impart substantially the same optical effect or function on all light signals projected by SLP 220 over a relatively wide range of angles of incidence at holographic combiner 230. For the purpose of the present systems, devices, and methods, the term "wide bandwidth" in relation to holograms and holographic films means an angular bandwidth that is greater than or equal to the total range of angles of incidence of all light signals received by any given point, region, or location of the hologram or holographic film from an optical replicator. As an example, WHUD 200 may implement a wide bandwidth hologram in holographic combiner 230 having an angular bandwidth of greater than or equal to about 8°. In this case, the spatial separation between virtual positions 261, 262, 263, and 264 may be such that any given point, region, or location of holographic combiner 230 receives light signals (i.e., spanning all instances 271, 272, 273, and 274) spanning an 8° (or less) range of angles of incidence at holographic combiner 230.

Consistent with conventional mirror behavior, for a single wide-bandwidth fast-converging hologram carried by holographic combiner 230 the angles of incidence for a range of light signals incident on holographic combiner 230 may influence the angles of reflection for that range of light signals redirected by holographic combiner 230. Since holographic combiner 230 is, generally during normal operation of WHUD 200, fixed in place relative to SLP 220, the angles of incidence for a range of light signals are determined, at least in part, by the particular virtual position 261, 262, 263, or 264 for the SLP 220 from which optical replicator 250 causes the range of light signals to effectively originate. The spatial position of the exit pupil 281, 282, 283, or 284 to which the range of light signals is converged by holographic combiner 230 is then determined, at least in part, by the angles of reflection of that range of light signals from holographic combiner 230. Each one of virtual positions 261, 262, 263, and 264 provides light signals over a respective range of angles of incidence (generally but not necessarily with at least some overlap) at holographic combiner 230 and therefore holographic combiner 230 converges light signals from each one of virtual positions 261, 262, 263, and 264 to a respective one of exit pupils 281, 282, 283, and 284. This is why, referring to FIG. 2B for example, the instance of the total scan range θ of SLP 220 that effectively originates from virtual position 261 (represented by lines with large dashes) with a range of relatively small angles of incidence (compared to the other instances of the total scan range θ of SLP 220 that effectively originate from virtual positions 262, 263, and 264) maps to exit pupil 281 with a range of relatively small angles of reflection (compared to the other exit pupils 282, 283, and 284) and the instance of the total scan range θ of SLP 220 that effectively originates from virtual position 264 (represented by lines with alternating large and short dashes) with a range of relatively large angles of incidence (compared to the other instances of the total scan range θ of SLP 220 that effectively originate from virtual positions 261, 262, and 263) maps to exit pupil 284 with a range of relatively large angles of reflection (compared to the other exit pupils 281, 282, and 283).

As a second example, rather than a single hologram, holographic combiner 230 may instead include any number of multiplexed holograms. Multiplexed holograms may be advantageous when, for example, multiple wavelengths of light signals are used (e.g., red, green, and blue light signals generated by SLP 220) and/or to provide a further means to separate light signals effectively originating from different virtual positions for SLP 220. The "single hologram" example described above may be suitable for an implementation in which SLP 220 only provides light signals of a single wavelength (e.g., only red light signals, only green light signals, or only blue light signals), but for implementations in which SLP 220 provides light signals of multiple wavelengths it may be advantageous for holographic combiner 230 to include a respective wavelength multiplexed hologram for each respective wavelength of light signals provided by SLP 220 (e.g., each respective nominal wavelength of light signals provided by SLP 220, since a laser diode may generally provide light signals over a narrow waveband). Thus, when SLP 220 includes three different laser diodes each providing light signals of a respective nominal wavelength (e.g., a red laser diode, a green laser diode, and a blue laser diode) it may be advantageous for holographic combiner 230 to include three wavelength-multiplexed holograms (e.g., a red hologram, a green hologram, and a blue hologram) each designed to work (e.g., "playback") for light signals having a respective one of the three nominal wavelengths. In this example, at least one "red hologram" (i.e., at least one hologram that is designed to playback for light signals having a wavelength that corresponds to red light) may converge a respective red component of each one of the N=4 instances of the total scan range θ of SLP 220 to a respective one of the N=4 exit pupils 281, 282, 283, and 284, at least one "green hologram" (i.e., at least one hologram that is designed to playback for light signals having a wavelength that corresponds to green light) may converge a respective green component of each one of the N=4 instances of the total scan range θ of SLP 220 to a respective one of the N=4 exit pupils 281, 282, 283, and 284, and at least one blue hologram (i.e., at least one hologram that is designed to playback for light signals having a wavelength that corresponds to blue light) may converge a respective blue component of each one of the N=4 instances of the total scan range θ of SLP 220 to a respective one of the N=4 exit pupils 281, 282, 283, and 284.

As a third example, either apart from or in addition to multiple wavelength-multiplexed holograms, holographic combiner 230 may include at least N angle-multiplexed holograms. That is, for an implementation with N=4 virtual positions 261, 262, 263, and 264 for the SLP 220 and N=4 exit pupils 281, 282, 283, and 284, holographic combiner 230 may include at least N=4 angle-multiplexed holograms (or N=4 sets of angle-multiplexed holograms when wavelength multiplexing is also employed, as discussed later on). Each of the N=4 angle-multiplexed holograms may be designed to playback for light signals effectively originating from a respective one of the N=4 virtual positions 261, 262, 263, and 264 for SLP 220 and converge such light signals to a respective one of the N=4 exit pupils 281, 282, 283, and 284. That is, a first angle-multiplexed hologram may be designed to playback for light signals effectively originating from first virtual position 261 for SLP 220 and converge such light signals to first exit pupil 281, a second angle-multiplexed hologram may be designed to playback for light signals effectively originating from second virtual position 262 for SLP 220 and converge such light signals to second exit pupil 282, a third angle-multiplexed hologram may be designed to playback for light signals effectively originating from third virtual position 263 for SLP 220 and converge such light signals to third exit pupil 283, and a fourth angle-multiplexed hologram may be designed to playback for light signals effectively originating from fourth virtual position 264 for SLP 220 and converge such light signals to fourth exit pupil 284.

For implementations that employ angle-multiplexing, it may be advantageous for the holographic film that includes an angle-multiplexed hologram to be of relatively narrow bandwidth. Particularly, it may be advantageous for the holographic film to have an angular bandwidth that is less than or about equal to the minimum difference between the respective angles of incidence of two light signals that are incident on the same point, region, or location of holographic combiner 230 but effectively originate from different virtual positions 261, 262, 263. 264. As an example, WHUD 200 may implement a narrow bandwidth angle-multiplexed hologram in holographic combiner 230 having an angular bandwidth of less than or equal to about 4°. In this case, the difference between the angle of incidence (at holographic combiner 230) of a first instance 271 of a light signal that effectively originates from virtual position 261 and is incident at a first point on holographic combiner 230 and the angle of incidence (at holographic combiner 230) of a second instance 272 of a (different) light signal 272 that effectively originates from virtual position 262 and is incident at the same first point on holographic combiner 230 may be less than or equal to about 4°. In this way, each respective angle-multiplexed hologram in holographic combiner 230 may be designed to substantially exclusively playback for light signals effectively originating from a respective one of virtual positions 261, 262, 263, and 264 for SLP 220 and to substantially not playback (e.g., insubstantially playback) for light signals effectively originating from the other ones of virtual positions 261, 262, 263, and 264 for SLP 220.

Generally, holographic combiner 230 may include at least N multiplexed holograms and each one of the at least N multiplexed holograms may converge a respective one of the N instances of a light signal from optical replicator 250 to a respective one of N exit pupils at or proximate the eye 290 of the user.

Some implementations may employ both wavelength multiplexing and angle multiplexing. For example, an implementation that employs angle multiplexing and light signals of multiple wavelengths (e.g., a multi-color SLP) may advantageously also employ wavelength multiplexing. In this case, holographic combiner 230 may include a wavelength-multiplexed and angle-multiplexed holographic combiner that includes at least N angle-multiplexed red holograms, at least N angle-multiplexed green holograms, and at least N angle-multiplexed blue holograms. Each one of the at least N angle-multiplexed red holograms may converge a respective red component of each one of N instances of any given light signal to a respective one of N exit pupils at or proximate the eye of the user, each one of the at least N angle-multiplexed green holograms may converge a respective green component of each one of N instances of any given light signal to a respective one of N exit pupils at or proximate the eye of the user, and each one of the at least N angle-multiplexed blue holograms may converge a respective blue component of each one of N instances of any given light signal to a respective one of N exit pupils at or proximate the eye of the user.

Implementations of holographic combiner 230 that employ multiple multiplexed holograms may include multiple holograms in or on a single layer (i.e., all in or on the same layer) of holographic film or may include multiple layers of holographic film with each layer of holographic film carrying at least one respective hologram. Holographic combiner 230 may or may not comprise at least one volumetric holographic optical element. Generally, holographic combiner 230 may comprise a single layer of holographic film that carries any number of holograms or holographic combiner 230 may comprise multiple layers of holographic film (e.g., multiple layers laminated together) with each respective layer of holographic film carrying any number of respective holograms.

Holographic combiner 230 may be substantially flat or planar in geometry or, as illustrated in FIGS. 2A, 2B, and 2C, holographic combiner 230 may embody some curvature. In some implementations, holographic combiner 230 may embody curvature because holographic combiner 230 is carried by a prescription eyeglass lens 240 that has some curvature. When necessary, holographic combiner 230 may include systems, devices, and/or methods for curved holographic optical elements described in U.S. Provisional Patent Application Ser. No. 62/268,892.

The various embodiments described herein provide systems, devices, and methods for eyebox expansion by exit pupil replication in scanning laser-based WHUDs. Each replicated exit pupil is aligned to a respective spatially-separated position at or proximate the eye of the user because the optical replicator that replicates the light signals spatially separates the replicated light signals so that each replicated light signal appears to effectively originate from a different spatially-separated virtual position for the SLP. The effect is substantially the same as if multiple SLPs were used instead of the optical replicator, with each SLP positioned in a respective one of the virtual positions and with each SLP projecting a respective instance of a light signal towards the holographic combiner; however, the use of the optical replicator has considerable advantages in terms of power savings and minimizing hardware bulk.

While the use of an optical replicator in lieu of multiple spatially-separated SLPs has many advantages, one potential drawback may arise from the fact that replicated instances of a light signal necessarily all embody substantially the same light signal. This can be problematic when, for example, each replicated instance of an image is made to effectively originate from a different spatially-separated virtual position for the SLP. In that case, each replicated instance of the image may be subject to a unique combination of optical distortions. For example, a first replicated instance of an image effectively originating from a first virtual position may be subject to a first set of optical distortions (e.g., image skewing, keystoning, aberrations, and so on) resulting from the unique path of the first instance of the image through the optical replicator and/or from the range of angles of incidence (at holographic combiner 230 and/or at eye 290) that correspond to the first virtual position for the SLP, while a second replicated instance of the image effectively originating from a second virtual position may be subject to a second set of optical distortions resulting from the unique path of the second instance of the image through the optical replicator and/or from the range of angles of incidence (at holographic combiner 230 and/or at eye 290) that correspond to the second virtual position for the SLP. If the first and second replicated instances of the image both correspond to the same initial version of the image defined by the SLP then there may be no opportunity to optically tune, adjust, correct, or otherwise compensate for distortions that are specific to the individual first and second instances of the image. Even though the replicated instances of the image may be optically the same at definition, the resulting replicated instances of the image seen by the user may not be the same because each instance of the image may be subject to individual image distortions. In accordance with the present systems, devices, and methods, this problem may be overcome (if necessary) by including a controllable shutter mechanism to controllably block all but one instance of a projected light signal at any given time, the one instance of the light signal that is not blocked by the shutter corresponding to an instance of the light signal that converges to a particular exit pupil that aligns with the user's gaze direction at that time.

Figure 3A:
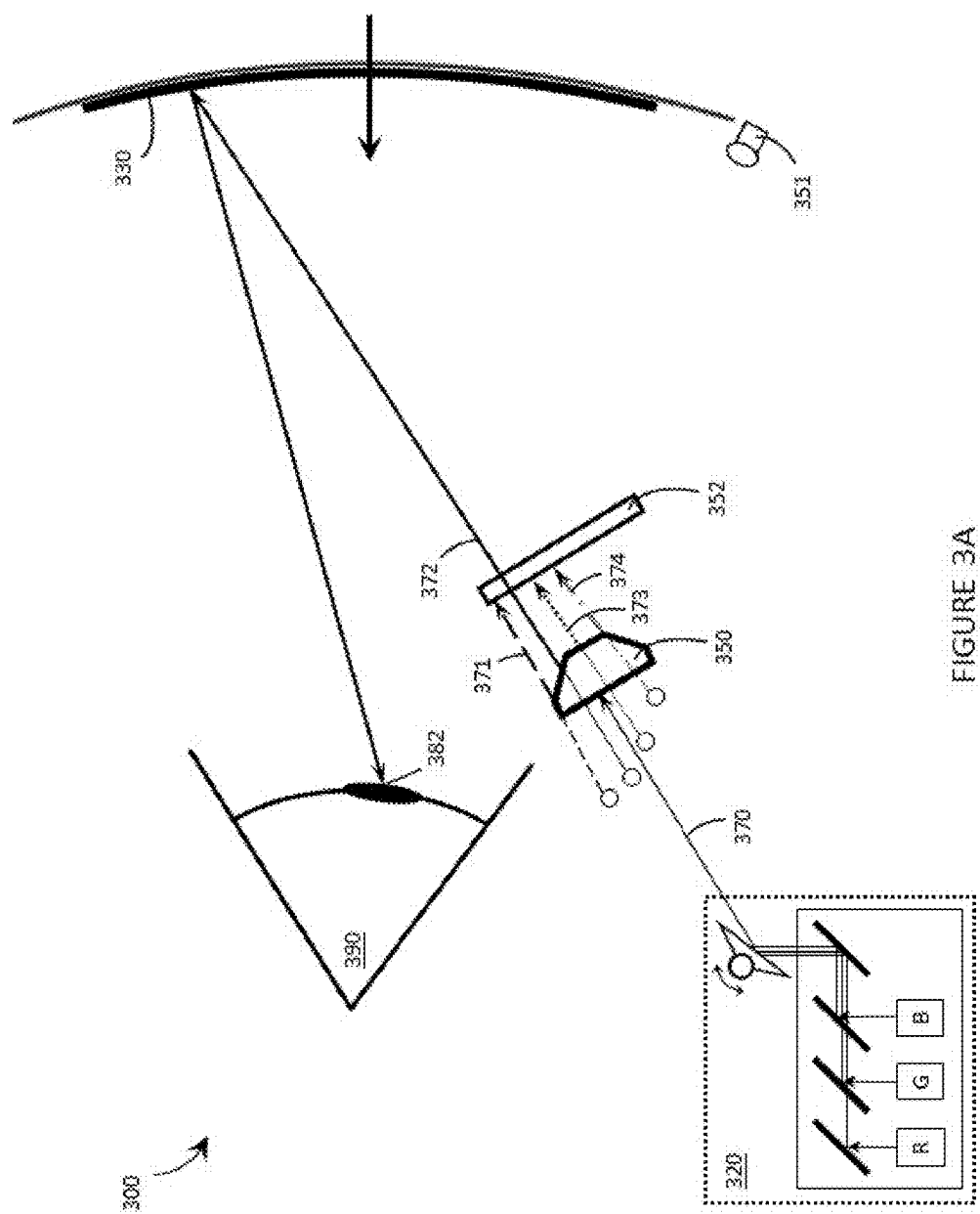
FIG. 3A is an illustrative diagram of a wearable heads-up display in operation showing eyebox expansion by exit pupil replication and a controllable shutter mechanism in accordance with the present systems, devices, and methods.

FIG. 3A is an illustrative diagram of a WHUD 300 in operation showing eyebox expansion by exit pupil replication and a controllable shutter mechanism 352 in accordance with the present systems, devices, and methods. WHUD 300 may be substantially similar to WHUD 200 from FIGS. 2A, 2B, and 2C with the following additions: WHUD 300 includes an eye tracker 351 (carried by the support structure of WHUD 300 which is not shown in FIG. 3A to reduce clutter), positioned and oriented to determine a gaze direction of the eye 390 of the user, and WHUD 300 includes at least one controllable shutter 352 (carried by the support structure of WHUD 300) positioned in at least one optical path (e.g., in all optical paths) between the optical replicator 350 and the holographic combiner 330.

In the illustrated operation of WHUD 300 depicted in FIG. 3A, a first light signal 370 is generated by the SLP 320 and projected towards (e.g., into or onto) optical replicator 350. As in WHUD 200, optical replicator 350 replicates first light signal 370 to produce N=4 (where 4 is again used only as a non-limiting example) instances 371, 372, 373, and 374 of first light signal 370 and redirects the N=4 instances 371, 372, 373, and 374 of first light signal 370 towards holographic combiner 330. However, as previously described, each one of the N=4 instances 371, 372, 373, and 374 of first light signal 370 may be subject to a respective (e.g., unique) optical distortion or set of optical distortions that may cause the corresponding instances of the image (or portion(s) of the image) represented by first light signal 370 to misalign if they are concurrently presented to the user. In accordance with the present systems, devices, and methods, such misalignment may be prevented by presenting only one of the N=4 instances 371, 372, 373, and 374 of first light signal 370 to the user at any given time. To this end, eye tracker 351 determines the position of the pupil of eye 390 (e.g., the gaze direction of the user) and controllable shutter 352 is controllable to selectively block all but at least one (e.g., 372 in FIG. 3A) of the N=4 instances 371, 372, 373, and 374 of first light signal 370 redirected towards holographic combiner 330 by optical replicator 350. The at least one (e.g., 372 in FIG. 3A) of the N=4 instances 371, 372, 373, and 374 of first light signal 370 that is not blocked by controllable shutter 352 corresponds to the at least one of the N=4 instances 371, 372, 373, and 374 of first light signal 370 that, when redirected by holographic combiner 330, is redirected by holographic combiner 330 towards a region (exit pupil 382 in FIG. 3A) of the eye 390 of the user that contains a pupil of eye 390 based on the gaze direction of eye 390 determined by eye tracker 351. Thus, in response to eye tracker 351 determining that the pupil of eye 390 aligns most with exit pupil 382 (relative to the other available exit pupils in WHUD 300), controllable shutter 352 selectively permits only the second instance 372 of first light signal 370 to pass through and be received and redirected by holographic combiner 330. Controllable shutter 352 selectively blocks first instance 371, third instance 373, and fourth instance 374 of first light signal 370 because first instance 371, third instance 373, and fourth instance 374 of first light signal 370 all map to exit pupils that do not align with the user's current gaze direction and may contribute undesirable optical distortions to the user's perception of the image (or portion(s) of the image) represented by first light signal 370.

Figure 3B:
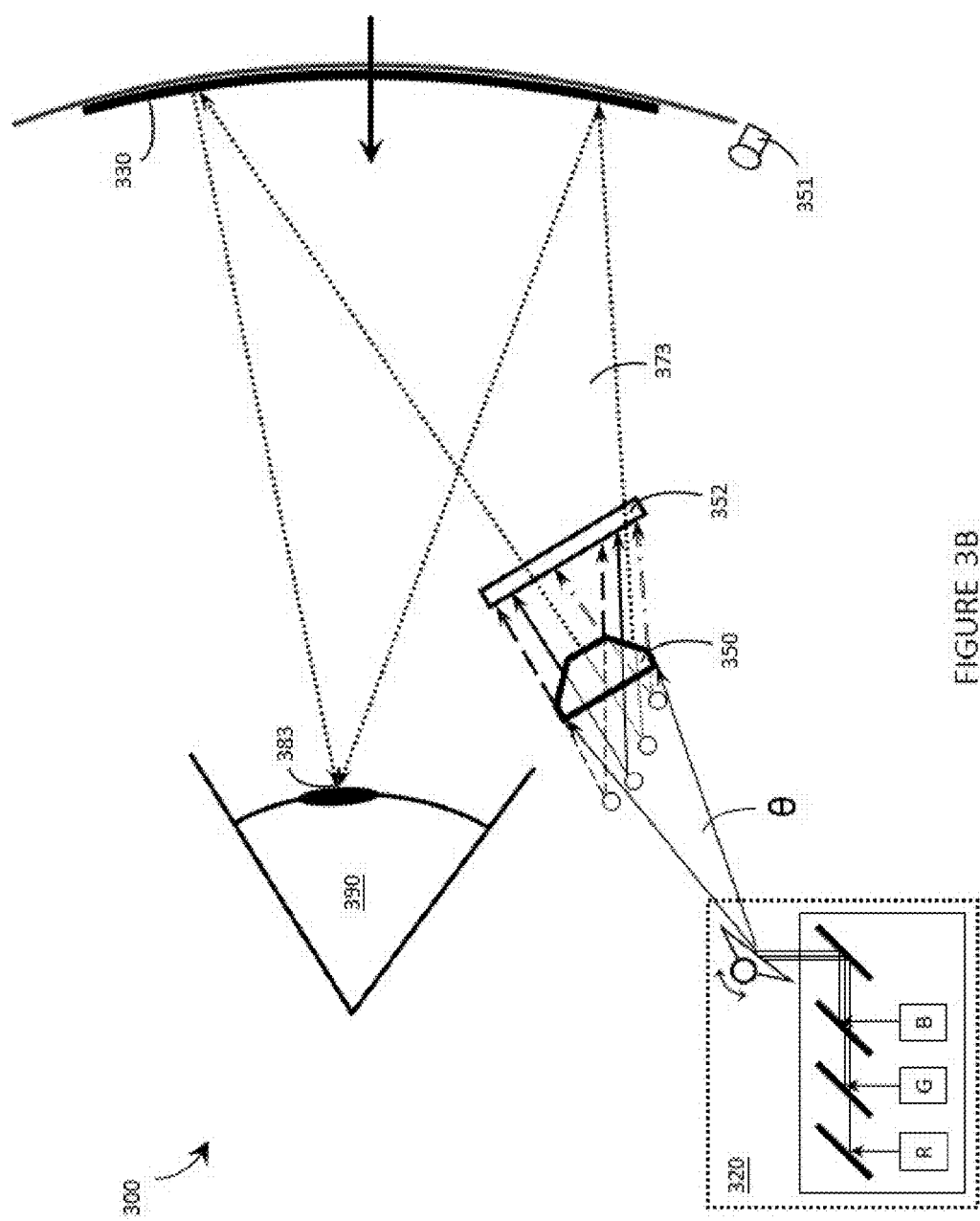
FIG. 3B is an illustrative diagram of the wearable heads-up display from FIG. 3A showing an operation of the controllable shutter for a sweep of the total scan range θ of the scanning laser projector in accordance with the present systems, devices, and methods.

FIG. 3B is an illustrative diagram of WHUD 300 from FIG. 3A showing an operation of controllable shutter 352 for a sweep of the total scan range θ of SLP 320 in accordance with the present systems, devices, and methods. The operation of controllable shutter 352 may be synchronized with the operation of SLP 320 so that controllable shutter 352 provides only a limited transmission region therethrough at any given time and that limited transmission region corresponds to the trajectory of the particular instance (e.g., 373 in FIG. 3B) of a light signal generated by SLP 320 and redirected by (e.g., rerouted by or routed through) optical replicator 350 that will be redirected by holographic combiner 330 towards the particular exit pupil 383 that best aligns with the current gaze direction of eye 390 as determined by eye tracker 351. Thus, even though a sweep of the total scan range θ of SLP 320 spans multiple regions of controllable shutter 350, controllable shutter 352 may be varied at a speed that substantially matches the sweep speed of SLP 320 so that the transmissive region of controllable shutter 352 moves with (e.g., follows) the sweep of the total scan range θ of SLP 320. In this way, a single instance of a complete sweep of the total scan range θ of SLP 320 may be transmitted through controllable shutter 352 while the other replicated instances of the sweep of the total scan range θ of SLP 320 may be blocked by controllable shutter 352.

When a controllable shutter 352 is used to selectively block/transmit individual ones of multiple N instances of a light signal (e.g., based on the eye's pupil position as determined by an eye tracker), the SLP may be calibrated to define each light signal in such a way that the light signal accommodates, compensates for, and/or generally accounts for the particular optical distortion(s) that apply to the particular instance of the light signal that current configuration of the controllable shutter 352 will transmit. At least one of eye tracker 351 and/or controllable shutter 352 may provide feedback about the current "active" exit pupil of WHUD 300 and SLP 320 may selectively operate in a mode that applies compensation and/or accommodation measures to light signals in order to account for the optical distortion(s) that are particular to the optical path(s) that correspond to the current "active" exit pupil.

Controllable shutter 352 may comprise any of a variety of different structures depending on the specific implementation. For example, controllable shutter 352 may comprise one or more MEMS-based or piezo-based elements for physically translating and/or rotating one or more opaque surface(s) in the optical path(s) between optical replicator 350 and holographic combiner 330, one or more controllable (e.g., translatable and/or rotatable) reflector(s) or refractor(s), one or more controllable polarization filter(s) together with one or more controllable polarizer(s) in SLP 320 or between SLP 320 and controllable shutter 352, and so on.

Eye tracker 351 may employ any of a variety of different eye tracking technologies depending on the specific implementation. For example, eye tracker 351 may employ any or all of the systems, devices, and methods described in U.S. Provisional Patent Application Ser. No. 62/167,767; U.S. Provisional Patent Application Ser. No. 62/271,135; U.S. Provisional Patent Application Ser. No. 62/245,792; and/or U.S. Provisional Patent Application Ser. No. 62/281,041.

As previously described, WHUD 300 may include at least one processor and at least one non-transitory processor-readable storage medium or memory communicatively coupled thereto. The at least one memory may store processor-executable data and/or instructions that, when executed by the at least one processor, cause the at least one processor to control the operation of any or all of eye tracker 351, controllable shutter 352, and/or SLP 320.

The illustrative examples of the present systems, devices, and methods depicted in FIGS. 2A, 2B, 2C, 3A, and 3B are all generally shown in two-dimensions and generally illustrate eyebox configurations in which multiple exit pupils are spatially separated in one dimension across the eye of the user. In practice, the expanded eyebox configurations described herein may comprise any number N of replicated exit pupils arranged in any two-dimensional configuration over the area of the eye of the user. An example configuration with N=4 replicated exit pupils is provided in FIG. 4.

Figure 4:
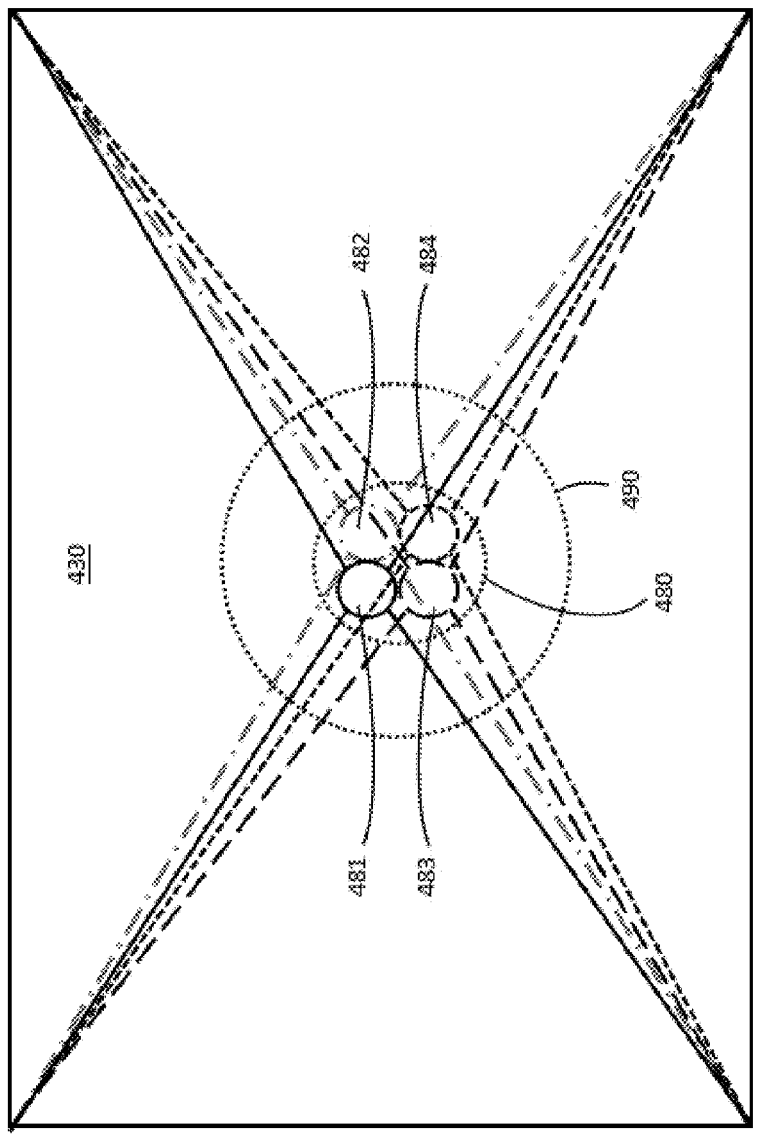
FIG. 4 is an illustrative diagram showing an exemplary holographic combiner in two-dimensions converging four instances of replicated light signals to form an expanded eyebox comprising four spatially-separated exit pupils at or proximate the eye of a user in accordance with the present systems, devices, and methods.

FIG. 4 is an illustrative diagram showing an exemplary holographic combiner 430 in two-dimensions converging four instances of replicated light signals to form an expanded eyebox 480 comprising four spatially-separated exit pupils 481, 482, 483, and 484 at or proximate the eye 490 of a user in accordance with the present systems, devices, and methods. Exit pupils 481, 482, 483, and 484 are distributed over a two-dimensional area at or near eye 490 to cover a wide range of pupil positions (e.g., gaze directions) for eye 490. As long as the pupil of eye 490 is positioned within eyebox 480, at least one of exit pupils 481, 482, 483, and 484 (in some cases a combination of at least two of exit pupils 481, 482, 483, and 484) will provide light signals through the pupil to eye 490 and the user will be able to see the projected image. In terms of optical path, each one of exit pupils 481, 482, 483, and 484 may receive light signals corresponding to a respective replicated instance of the total scan range θ of an SLP.

Exemplary optical replicators 250 and 350 drawn in FIGS. 2A, 2B, 2C, 3A and 3B are faceted, prismatic structures. Such structures are shown for illustrative purposes only and not intended to limit the composition of the optical replicators described herein to prismatic, faceted structures or structures of similar geometry. While faceted, prismatic structures may be suitable as optical replicators in certain implementations, as previously described the optical replicators described herein may comprise any of a variety of different components depending on the specific implementation. A non-limiting example of the construction and operation of an optical replicator as described herein is provided in FIG. 5.

Figure 5:
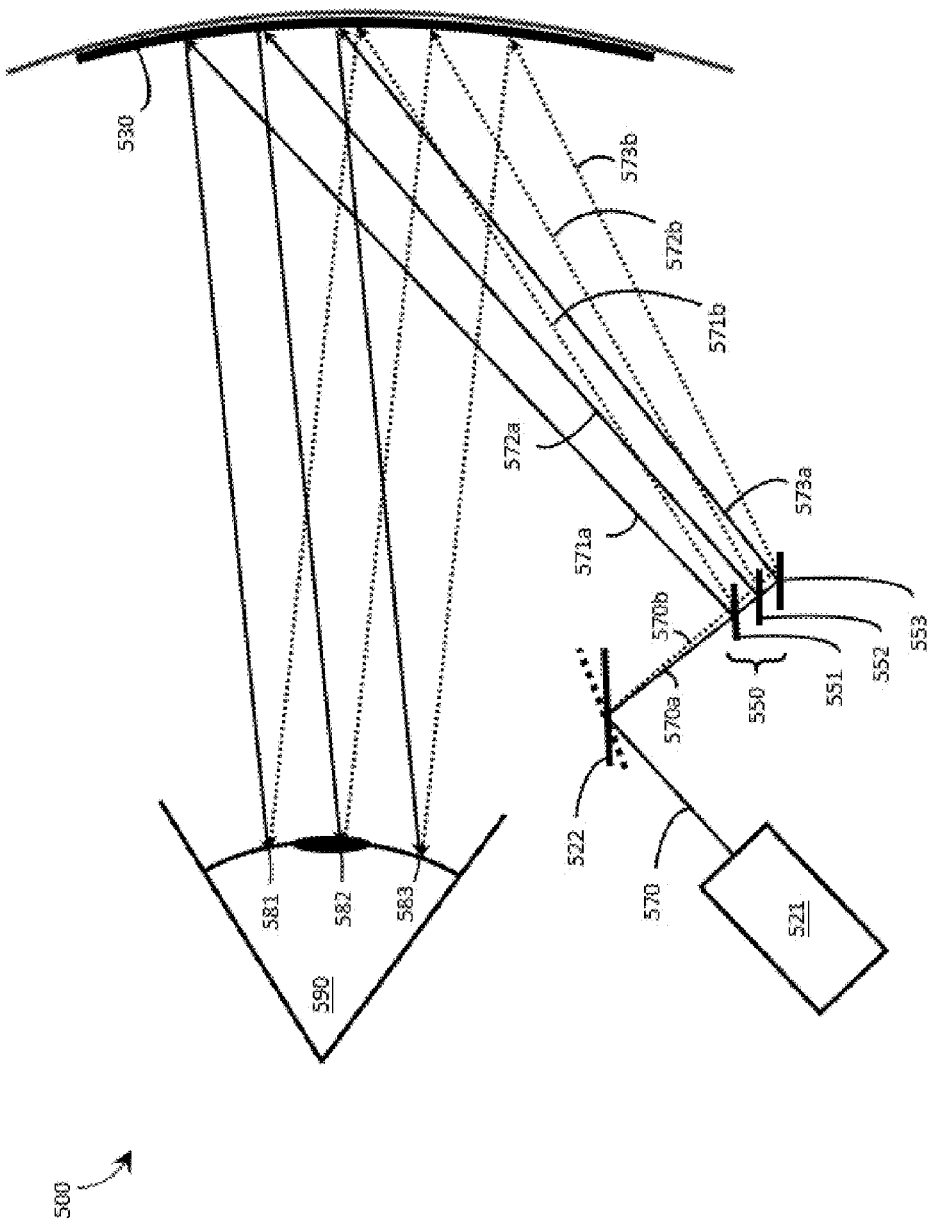
FIG. 5 is an illustrative diagram of a wearable heads-up display in operation showing eyebox expansion by exit pupil replication using an exemplary optical replicator in accordance with the present systems, devices, and methods.

FIG. 5 is an illustrative diagram of a WHUD 500 in operation showing eyebox expansion by exit pupil replication using an exemplary optical replicator 550 in accordance with the present systems, devices, and methods. WHUD 500 includes a support structure (not shown in FIG. 5 to reduce clutter) that may generally resemble a typical eyeglass frame and a SLP that comprises a laser module 521 (e.g., an RGB laser module) and at least one scan mirror 522. In use, laser module 521 produces a series of light signals 570, each representative of a respective portion of an image to be displayed to the user. Light signals 570 are directed from laser module 521 to at least one scan mirror (such as a MEMS-based digital micromirror) 522 that is controllably variable (e.g., variable in rotational orientation, curvature, or the like) to reflect the light signals 570 towards select regions of a holographic combiner 530. Holographic combiner 530 redirects (e.g., reflects and/or optionally converges) light signals 570 towards the user's eye 590 and into the user's field of view. In order to increase the effective eyebox of WHUD 500, WHUD 500 further includes an optical replicator 550. In the illustrated embodiment, optical replicator 550 comprises a set of three partial reflectors 551, 552, and 553 arranged in series in between scan mirror 522 and holographic combiner 530 with respect to the optical paths of light signals 570. A person of skill in the art will be familiar with various optical device(s) that are partial reflectors 551, 552, and 553, including without limitation: beam-splitters, half-silvered mirrors, dichroic mirrored prisms, dichroic or dielectric optical coatings, and the like. Each partial reflector 551, 552, and 553 in optical replicator 550 reflects a respective portion (e.g., $R_i$%, where i denotes the specific partial reflector) of each light signal 570 and transmits any unreflected portion (i.e., $T_i=(1-R_i)$%. In this way, optical replicator 550 effectively replicates each light signal 570 into three spatially-separated and temporally-parallel instances 571a, 572a, and 573a. The portion of a light signal 570 that is reflected by each partial reflector 551, 552, and 553 may be designed so that each resulting instance 571a, 572a, and 573a has substantially the same brightness. For example, a light signal 570 may initially have a brightness X. The first partial reflector 551 in optical replicator 550 may reflect $R_{551}$% of light signal 570 as first instance 571a and transmit $T_{551}$% of light signal 570 through to the second partial reflector 552 in optical replicator 550. The second partial reflector 550 in optical replicator 550 may reflect $R_{552}$% of the portion of light signal 570 that was transmitted through the first partial reflector 551 in optical replicator 550 as second instance 572a and transmit $T_{552}$% of the portion of light signal 570 that was transmitted through the first partial reflector 551. The third partial reflector 553 in optical replicator 550 may reflect all (i.e., $R_{553}=100$%) of the portion of light signal 570 that was transmitted through the second partial reflector 552 in optical replicator 550 as instance 573a. In this case, third partial reflector 553 may not be a "partial" reflector at all but may be a full mirror or other substantially compete reflector. In general, uniform brightness across the replicated instances 571a, 572a, and 573a may be achieved with $R_{553}>R_{552}>R_{551}$. Optical replicator 550 includes three partial reflectors 551, 552, and 553 to produce three instances 571a, 572a, and 573a of each light signal 570, though in practice any number of partial reflectors may be used to produce any corresponding number of instances of a light signal. By replicating light signals 570 as multiple instances 571a, 572a, and 573a by optical replicator 550, each instance 571a, 572a, and 573a ultimately relays the same portion of the image to a different region of the user's eye 590, thereby enabling the user to see that portion of the image from various different eye positions. Because each one of instances 571a, 572a, and 573a represents the same portion of an image, the exemplary implementations of holographic combiner 530 is designed to redirect each one of instances 571a, 572a, and 573a substantially in parallel with one another towards respective regions of eye 590 (as described in the implementation in FIG. 2C).

The partial reflectors 551, 552, and 553 in optical replicator 550 may be substantially parallel with one another. In this case, the numerous instances 571a, 572a, and 573a of light signals 570 emitted from optical replicator 550 may be essentially parallel with one another and the eyebox of WHUD 500 may be effectively increased in size by about the total width spanned by the set of parallel instances 571a, 572a, and 573a of light signal 570. To further expand the eyebox, the partial reflectors 551, 552, and 553 in optical replicator 550 may be oriented at slight angles with respect to one another so that the instances 571a, 572a, and 573a of light signals 570 are divergent with respect to one another when emitted by optical replicator 550. This way, the instances 571a, 572a, and 573a of light signals 570 may span a greater area and reach wider-spread regions on eye 590.

FIG. 5 illustrates two different configurations of scan mirror 522 (a first configuration represented by a solid line and a second configuration represented by a dotted line), respectively corresponding to two different light signals 570a and 570b emitted by laser module 521. After passing through optical replicator 550, the first, solid-line configuration of scan mirror 522 results in three instances 571a, 572a, and 573a (also represented by solid lines) of a first light signal 570a impingent on three points on holographic combiner 530. Each of the three instances 571a, 572a, and 573a of first light signal 570a corresponds to a respective replicated instance of a portion of an image represented by first light signal 570a. Accordingly, each of three instances 571a, 572a, and 573a is redirected by holographic combiner 530 spatially in parallel with one another towards respective spatially-separated exit pupil 581, 582, and 583 at eye 590 (similar to the exemplary implementation of FIG. 2C). The second, dotted-line configuration of scan mirror 522 results in three instances 571b, 572b, and 573b (also represented by dotted lines) of a second light signal 570b also impingent on three points on holographic combiner 530. Each of the three instances 571b, 572b, and 573b of second light signal 570b corresponds to a respective replicated instance of a portion of an image represented by second light signal 570b. Accordingly, each of three instances 571b, 572b, and 573b is redirected by holographic combiner 530 spatially in parallel with one another towards respective spatially-separated exit pupil 581, 582, and 583 at eye 590. Because first light signal 570a and second light signal 570b each represents a different portion of an image, instances 571a, 572a, and 573a are redirected by holographic combiner 530 towards eye 590 all at a different angle from instances 571b, 572b, and 573b. Holographic combiner 530 converges: first instance 571a of first light signal 570a and first instance 571b of second light signal 570b to a first exit pupil 581, second instance 572a of first light signal 570a and second instance 572b of second light signal 570b to a second exit pupil 582, and third instance 573a of first light signal 570a and third instance 573b of second light signal 570b to a third exit pupil 583.

Optical replicator 550 makes use of three partial reflectors 551, 552, and 553 in order to produce three instances 571a, 572a, and 573a of a light signal 570a directed towards holographic combiner 530 at respectively different angles and/or from respectively different virtual positions for scan mirror 522 and/or laser module 521. However, partial reflectors 551, 552, and 553 are used in optical replicator 550 in the implementation of FIG. 5 for exemplary purposes only and, in accordance with the present systems, devices, and methods other systems, devices, structures, methods, and/or techniques of replicating light signals 570 may be employed in optical replicator 550. In some implementations, the effect or function of an optical replicator 550 may be built into and realized by a holographic combiner 530. That is, some architectures of a WHUD may exclude discrete optical replicator 550 and instead achieve such replication upon redirection of light signals 570 from holographic combiner 530. For example, holographic combiner 530 may comprise a first hologram carried by a first layer of holographic material that reflects a first portion $R_1$ of an impingent light signal and transmits the remaining portion $T_1=1-R_1$, a second hologram carried by a second layer of holographic material that reflects a second portion $R_2$ of the portion of the light signal that was transmitted through the first layer of holographic material and transmits the remaining portion $T_2=1-R_2$, and so on. In order to spread the resulting copies or instances of the light signal out further than the small distance between layers of the holographic combiner 530 would otherwise allow, refraction between successive layers in the holographic combiner 530 may be employed (e.g., by using different materials with respective refractive indices for successively adjacent layers). Alternatively, a holographic combiner 530 may employ a single layer that is designed to produce multiple diffraction orders upon reflection of a light signal therefrom, with each diffraction order corresponding to a respective instance of the reflected light signal.

In addition to various WHUD systems and devices that provide eyebox expansion by exit pupil replication, the various embodiments described herein also include methods of expanding the eyebox of a WHUD by exit pupil replication.

Figure 6:
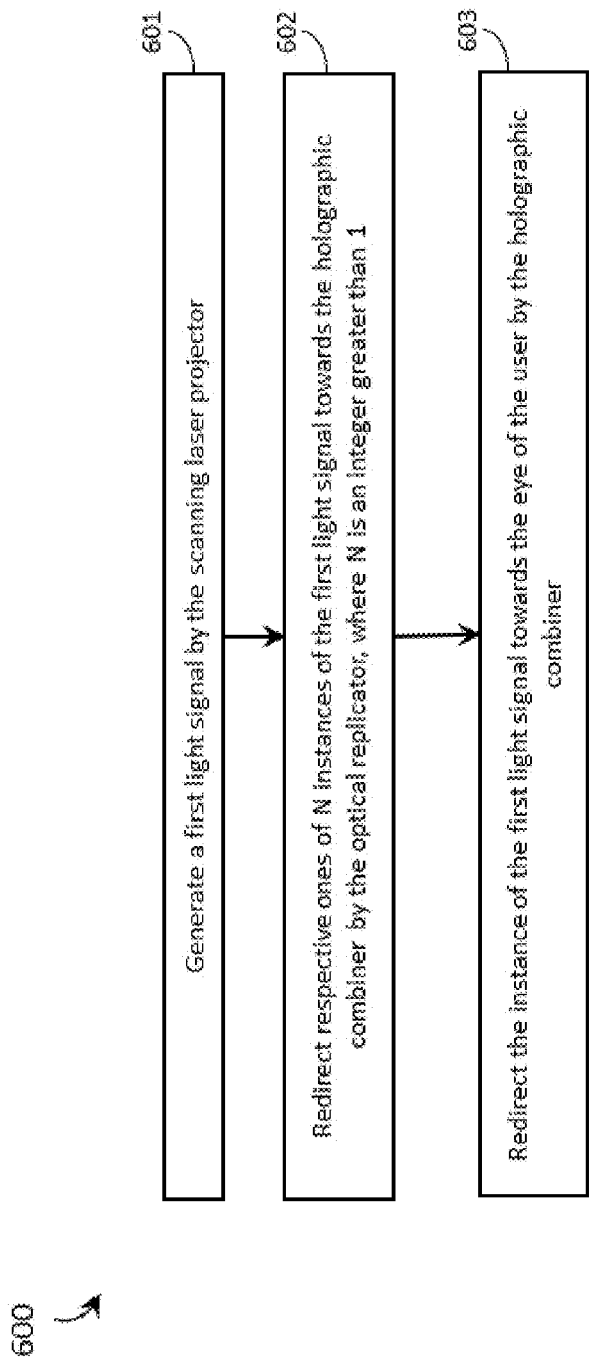
FIG. 6 is a flow-diagram showing a method of operating a wearable heads-up display in accordance with the present systems, devices, and methods.

FIG. 6 is a flow-diagram showing a method 600 of operating a WHUD in accordance with the present systems, devices, and methods. The WHUD may be substantially similar to WHUD 100, WHUD 200, or WHUD 300 (as appropriate based on the descriptions of the specific acts that follow) and generally includes a SLP, an optical replicator, and a holographic combiner. Method 600 includes three acts 601, 602, and 603, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 600, the term "user" refers to a person that is wearing the WHUD.

At 601, an SLP of the WHUD generates a first light signal. The first light signal may represent a complete first image or a portion of a first image. For example, the first light signal may represent one or more pixel(s) of an image.

At 602, the optical replicator redirects respective ones of N instances of the first light signal towards the holographic combiner, where N is an integer greater than 1. Generally, in between acts 601 and 602 the optical replicator may receive the first light signal from the SLP and replicate (e.g., optically split, furcate, branch, divide, multiply, or otherwise replicate) the first light signal into the N instances of the first light signal. When the first light signal represents an image comprising at least two pixels, the optical replicator may redirect N respective instances of the image towards the holographic combiner at 602. When the first light signal represents one or more pixel(s) of an image, the optical replicator may redirect N instances of the one or more pixel(s) of the image towards the holographic combiner at 602. As described previously, the optical replicator may redirect respective ones of N instances of the first light signal towards the holographic combiner effectively from respective ones of N spatially-separated virtual positions for the SLP.

At 603, the holographic combiner redirects each instance of the first light signal received from the optical replicator towards the eye of the user. As described in more detail later on, one or more instances of the first light signal may be selectively blocked by a controllable shutter and therefore may not be received from the optical replicator by the holographic combiner. Depending on the specific implementation, the holographic combiner may redirect each instance of the first light signal received from the optical replicator spatially in parallel with one another towards the eye of the user. The holographic combiner may converge each instance of the first light signal received from the optical replicator towards a respective exit pupil at or proximate the eye of the user.

In some implementations, the holographic combiner may include a hologram that redirects instances of the first light signal towards respective exit pupils at the eye of the user based on the angle of incidence (at the holographic combiner) of each instance of the first light signal resulting from the particular virtual position for the SLP to which the instance of the first light signal corresponds. Even in such implementations, the holographic combiner may comprise at least two wavelength multiplexed holograms to respectively playback for (e.g., perform the redirecting and/or converging of act 603) at least two components of the first light signal having different wavelengths, such as at least two color components of the first light signal. For example, the SLP may comprise a red laser diode, a green laser diode, and a blue laser diode and the first light signal may comprise a red component, a green component, and a blue component. In this case, the holographic combiner may comprise a red hologram, a green hologram, and a blue hologram and: the red hologram may converge a respective red component of each instance of the first light signal that is received from the optical replicator to a respective exit pupil at or proximate the eye of the user, the green hologram may converge a respective green component of each instance of the first light signal that is received from the optical replicator to a respective exit pupil at or proximate the eye of the user, and the blue hologram may converge a respective blue component of each instance of the first light signal that is received from the optical replicator to a respective exit pupil at or proximate the eye of the user.

In some implementations, the holographic combiner may include at least two multiplexed holograms and each hologram may converge a respective instance of the first light signal that is received from the optical replicator to a respective exit pupil at or proximate the eye of the user. Continuing on the example above, the holographic combiner may include at least two angle-multiplexed red holograms, at least two angle-multiplexed green holograms, and at least two angle-multiplexed blue holograms. In this case, a respective angle-multiplexed red hologram may converge a respective red component of each instance of the first light signal that is received from the optical replicator to a respective exit pupil at or proximate the eye of the user, a respective angle-multiplexed green hologram may converge a respective green component of each instance of the first light signal that is received from the optical replicator to a respective exit pupil at or proximate the eye of the user, and a respective angle-multiplexed blue hologram may converge a respective blue component of each instance of the first light signal that is received from the optical replicator to a respective exit pupil at or proximate the eye of the user.

Method 600 may be extended in various ways. For example, the SLP may generate at least a second light signal (e.g., corresponding to at least a second image, or at least a second pixel of the first image, or at least a second set of pixels of the first image), the optical replicator may redirect respective ones of N instances of the at least a second light signal towards the holographic combiner, and the holographic combiner may converge each instance of the at least a second light signal that is received from the optical replicator to a respective exit pupil at or proximate the eye of the user. Similarly, the SLP may generate light signals corresponding to a sweep of the total scan range $\theta$ of the SLP, the optical replicator may receive the total scan range $\theta$ of the SLP and redirect respective ones of N instances of the total scan range $\theta$ of the SLP towards the holographic combiner, and the holographic combiner may converge each instance of the total scan range $\theta$ of the SLP that is received from the optical replicator to a respective exit pupil at or proximate the eye of the user.

Furthermore, as previously described, the WHUD may include an eye tracker and at least one controllable shutter communicatively coupled to (either directly or through one or more other devices such as a processor and/or memory) the eye tracker. In this case, the eye tracker may determine the gaze direction (e.g., pupil position) of the eye of the user and the at least one controllable shutter may selectively block all but at least one of the N instances of the light signal redirected towards the holographic combiner from the optical replicator. For the at least one of the N instances of the first light signal that is not blocked by the at least one controllable shutter (i.e., the "unblocked instance"), the holographic combiner may redirect the unblocked instance of the first light signal towards a region of the eye of the user that contains the pupil of the eye of the user based on the gaze direction of the eye of the user determined by the eye tracker.

In accordance with the present systems, devices, and methods, the eyebox of a retina-scanning projector may be expanded by replication of one or more exit pupils. In this approach, a given exit pupil may have a defined size that is about equal to or smaller than the diameter of the eye's pupil, such as about 4 mm or less (e.g., about 2 mm), so that all light from an image enters the eye when the exit pupil impinges on (e.g., e.g., aligns with or overlies) the user's (physical) pupil. However, when the user moves their eye, alignment between the exit pupil and the user's pupil may be lost and the projected image may disappear from the user's field of view. Thus, in the "eyebox expansion through exit pupil replication" approaches described herein, multiple exit pupils may be projected and tiled over the user's eye so that at least one exit pupil aligns with the user's eye for multiple, many, most, or all eye positions.

Throughout this specification and the appended claims, the term "about" is sometimes used in relation to specific values or quantities. For example, fast-convergence within "about 2 cm." Unless the specific context requires otherwise, the term about generally means±15%.

The "optical replicator" described herein is an optical device. A non-limiting example of an optical replicator comprising an arrangement of partial reflectors is illustrated in (and described with reference to) FIG. 5; however, the present systems, devices, and methods are not intended to be limited to the exemplary implementation of an optical replicator from FIG. 5. An optical replicator as described herein may comprise any number and/or arrangement of beam-splitters, prisms, half-silvered surfaces, dichroics, dielectric coatings, and/or any other optical device(s) that a person of skill in the art would employ to optically replicate the light signal or image as described herein. A person of skill in the art will appreciate that the optical replication described herein may be accomplished using a wide range of different optical device(s), individually or in combination, depending on the requirements of the specific implementation. Accordingly, the present systems, devices, and methods are representative of implementations in which an optical device or arrangement of optical devices optically replicates a light signal or image as described herein.

A person of skill in the art will appreciate that the present systems, devices, and methods may be applied or otherwise incorporated into WHUD architectures that employ one or more light source(s) other than a SLP. For example, in some implementations the SLP described herein may be replaced by another light source, such as a light source comprising one or more light-emitting diodes ("LEDs"), one or more organic LEDs ("OLEDs"), one or more digital light processors ("DLPs"). Such non-laser implementations may advantageously employ additional optics to collimate, focus, and/or otherwise direct projected light signals. Unless the specific context requires otherwise, a person of skill in the art will appreciate that references to a "SLP" throughout the present systems, devices, and methods are representative and that other light sources (combined with other optics, as necessary) may be applied or adapted for application to serve the same general purpose as the SLPs described herein.

A person of skill in the art will appreciate that the present systems, devices, and methods may be applied or otherwise incorporated into WHUD architectures that employ one or more transparent combiner(s) other than a holographic combiner. For example, in some implementations the holographic combiner described herein may be replaced by a non-holographic device that serves substantially the same general purpose, such as prismatic film, a film that carries a microlens array, and/or a waveguide structure. Such non-holographic implementations may or may not employ additional optics. Unless the specific context requires otherwise, a person of skill in the art will appreciate that references to a "holographic combiner" throughout the present systems, devices, and methods are representative and that other transparent combiners (combined with other optics, as necessary) may be applied or adapted for application to serve the same general purpose as the holographic combiners described herein.

A person of skill in the art will appreciate that the various embodiments for eyebox expansion by exit pupil replication described herein may be applied in non-WHUD applications. For example, the present systems, devices, and methods may be applied in non-wearable heads-up displays and/or in other projection displays, including virtual reality displays, in which the holographic combiner need not necessarily be transparent.

In binocular implementations (i.e., implementations in which display content is projected into both eyes of the user), the total field of view may be increased by deliberately projecting a different field of view to each eye of the user. The two fields of view may overlap, so that both eyes see content at the center of the field of view while the left eye sees more content at the left of the field of view and the right eye sees more content at the right of the field of view.

In some implementations that employ multiple exit pupils, all exit pupils may optionally be active at all times. Alternatively, implementations that also employ eye-tracking, may activate only the exit pupil that corresponds to where the user is looking (based on eye-tracking) while one or more exit pupil(s) that is/are outside of the user's field of view may be deactivated.

In some implementations, the scan range of the projector can be actively changed to increase resolution in the direction the eye is looking or in the occupied exit pupil. Such is an example of heterogeneous image resolution as described in U.S. Provisional Patent Application Ser. No. 62/134,347.

Eyebox expansion may advantageously enable a user to see displayed content while gazing in a wide range of directions. Furthermore, eyebox expansion may also enable a wider variety of users having a wider range of eye arrangements to adequately see displayed content via a given WHUD. Anatomical details such as interpupillary distance, eye shape, relative eye positions, and so on can all vary from user to user. The various eyebox expansion methods described herein may be used to render a WHUD more robust over (and therefore more usable by) a wide variety of users having anatomical differences. In order to even further accommodate physical variations from user to user, the various WHUDs described herein may include one or more mechanical structure(s) that enable the user to controllably adjust the physical position and/or alignment of one or more exit pupil(s) relative to their own eye(s). Such mechanical structures may include one or more hinge(s), dial(s), flexure(s), tongue and groove or other slidably-coupled components, and the like. Alternatively, the approaches taught herein may advantageously avoid the need for inclusion of such additional mechanical structures, allowing a smaller package and less weight than might otherwise be obtainable.

In some implementations, one or more optical fiber(s) may be used to guide light signals along some of the paths illustrated herein.

The various implementations described herein may, optionally, employ the systems, devices, and methods for preventing eyebox degradation described in U.S. Provisional Patent Application Ser. No. 62/288,947.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

The various implementations of WHUDs described herein may include any or all of the technologies described in U.S. Provisional Patent Application Ser. No. 62/117,316, U.S. Provisional Patent Application Ser. No. 62/156,736, and/or U.S. Provisional Patent Application Ser. No. 62/242,844.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/214,600, U.S. Provisional Patent Application Ser. No. 62/268,892, U.S. Provisional Patent Application Ser. No. 62/167,767, U.S. Provisional Patent Application Ser. No. 62/271,135, U.S. Provisional Patent Application Ser. No. 62/245,792, U.S. Provisional Patent Application Ser. No. 62/281,041, U.S. Provisional Patent Application Ser. No. 62/134,347, U.S. Provisional Patent Application Ser. No. 62/288,947, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, U.S. Provisional Patent Application Ser. No. 62/117,316, U.S. Provisional Patent Application Ser. No. 62/156,736, and U.S. Provisional Patent Application Ser. No. 62/242,844, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display comprising:
    a support structure that in use is worn on a head of a user;
    a scanning laser projector carried by the support structure;
    a holographic combiner carried by the support structure, wherein the holographic combiner is positioned within a field of view of an eye of the user when the support structure is worn on the head of the user;
    an optical replicator carried by the support structure and positioned in an optical path between the scanning laser projector and the holographic combiner, the optical replicator comprising at least one optical element arranged to receive a light signal generated by the scanning laser projector and redirect respective ones of N instances of the light signal towards the holographic combiner, where N is an integer greater than 1, and wherein the holographic combiner comprises at least one hologram positioned and oriented to redirect each one of the N instances of the light signal towards the eye of the user;
    an eye tracker carried by the support structure, positioned and oriented to determine a gaze direction of the eye of the user; and
    at least one controllable shutter carried by the support structure and positioned in at least one optical path between the optical replicator and the holographic combiner, the at least one controllable shutter controllable to selectively block all but at least one of the N instances of the light signal redirected towards the holographic combiner by the optical replicator, the at least one of the N instances of the light signal that is not blocked by the at least one controllable shutter corresponding to the at least one of the N instances of the light signal that, when redirected by the holographic combiner, is redirected by the holographic combiner towards a region of the eye of the user that contains a pupil of the eye of the user based on the gaze direction of the eye of the user determined by the eye tracker.

2. The wearable heads-up display of claim 1 wherein the at least one hologram of the holographic combiner redirects the N instances of the light signal all spatially in parallel with one another towards respective regions of the eye of the user.

3. The wearable heads-up display of claim 1 wherein at least one optical element of the optical replicator is arranged to redirect respective ones of the N instances of the light signal towards the holographic combiner effectively from respective ones of N spatially-separated virtual positions for the scanning laser projector.

4. The wearable heads-up display of claim 1 wherein the support structure has a general shape and appearance of an eyeglasses frame.

5. The wearable heads-up display of claim 4, further comprising:
    a prescription eyeglass lens, wherein the holographic combiner is carried by the prescription eyeglass lens.

6. The wearable heads-up display of claim 1 wherein the at least one hologram of the holographic combiner converges each one of the N instances of the light signal to a respective one of N exit pupils at or proximate the eye of the user.

7. The wearable heads-up display of claim 6 wherein the holographic combiner includes at least N multiplexed holograms, and wherein each one of the at least N multiplexed holograms converges a respective one of the N instances of the light signal to a respective one of the N exit pupils at or proximate the eye of the user.

8. The wearable heads-up display of claim 6 wherein:
    the scanning laser projector includes a red laser diode, a green laser diode, and a blue laser diode; and
    the holographic combiner includes a wavelength-multiplexed holographic combiner that includes at least one red hologram, at least one green hologram, and at least one blue hologram, and wherein the at least one red hologram converges a respective red component of each one of the N instances of the light signal to a respective one of the N exit pupils at or proximate the eye of the user, the at least one green hologram converges a respective green component of each one of the N instances of the light signal to a respective one of the N exit pupils at or proximate the eye of the user, and the at least one blue hologram converges a respective blue component of each one of the N instances of the light signal to a respective one of the N exit pupils at or proximate the eye of the user.

9. The wearable heads-up display of claim 8 wherein the holographic combiner includes a wavelength-multiplexed and angle-multiplexed holographic combiner that includes at least N angle-multiplexed red holograms, at least N angle-multiplexed green holograms, and at least N angle-multiplexed blue holograms, and wherein each one of the at least N angle-multiplexed red holograms converges a respective red component of each one of the N instances of the light signal to a respective one of the N exit pupils at or proximate the eye of the user, each one of the at least N angle-multiplexed green holograms converges a respective green component of each one of the N instances of the light signal to a respective one of the N exit pupils at or proximate the eye of the user, and each one of the at least N angle-multiplexed blue holograms converges a respective blue component of each one of the N instances of the light signal to a respective one of the N exit pupils at or proximate the eye of the user.

10. The wearable heads-up display of claim 1 wherein the optical path between the scanning laser projector and the holographic combiner includes a total scan range θ of the scanning laser projector, and wherein at least one optical element of the optical replicator is arranged to receive all light signals corresponding to a sweep of the total scan range θ by the scanning laser projector and redirect respective ones of N instances of all light signals corresponding to the sweep of the total scan range θ of the scanning laser projector towards the holographic combiner.

11. The wearable heads-up display of claim 1 wherein the light signal includes an image comprising at least two pixels.

12. The wearable heads-up display of claim 11 wherein each one of the N instances of the light signal includes a respective instance of the image.

13. The wearable heads-up display of claim 1 wherein each one of the N instances of the light signal includes a respective instance of a same pixel in a different instance of a same image.

14. A method of operating a wearable heads-up display, the wearable heads-up display including a scanning laser projector, an optical replicator, an eye tracker, at least one controllable shutter, and a holographic combiner positioned within a field of view of an eye of a user when the wearable heads-up display is worn on a head of the user, the method comprising:
generating a first light signal by the scanning laser projector;
redirecting respective ones of N instances of the first light signal towards the holographic combiner by the optical replicator, where N is an integer greater than 1;
redirecting each instance of the first light signal that is received from the optical replicator towards the eye of the user by the holographic combiner;
determining a gaze direction of the eye of the user by the eye tracker; and
selectively blocking all but at least one of the N instances of the light signal redirected towards the holographic combiner from the optical replicator by the at least one controllable shutter, and wherein;
redirecting each instance of the first light signal that is received from the optical replicator towards the eye of the user by the holographic combiner includes, for the at least one of the N instances of the first light signal that is not blocked by the at least one controllable shutter, redirecting, by the holographic combiner, the at least one of the N instances of the first light signal towards a region of the eye of the user that contains a pupil of the eye of the user based on the gaze direction of the eye of the user determined by the eye tracker.

15. The method of claim 14, further comprising:
receiving the first light signal from the scanning laser projector by the optical replicator; and
replicating the first light signal into the N instances of the first light signal by the optical replicator.

16. The method of claim 14 wherein redirecting each instance of the first light signal that is received from the optical replicator towards the eye of the user by the holographic combiner includes redirecting each instance of the first light signal that is received from the optical replicator spatially in parallel with one another towards respective regions of the eye of the user by the holographic combiner.

17. The method of claim 14 wherein redirecting respective ones of N instances of the first light signal towards the holographic combiner by the optical replicator includes redirecting respective ones of N instances of the first light signal towards the holographic combiner by the optical replicator effectively from respective ones of N spatially-separated virtual positions for the scanning laser projector.

18. The method of claim 14 wherein redirecting each instance of the first light signal that is received from the optical replicator towards the eye of the user by the holographic combiner includes converging each instance of the first light signal that is received from the optical replicator to a respective exit pupil at or proximate the eye of the user by the holographic combiner.

19. The method of claim 18 wherein the holographic combiner includes at least two multiplexed holograms, and wherein converging each instance of the first light signal that is received from the optical replicator to a respective exit pupil at or proximate the eye of the user by the holographic combiner includes converging each instance of the first light signal that is received from the optical replicator to a respective exit pupil at or proximate the eye of the user by a respective multiplexed hologram.

20. The method of claim 19 wherein:
the scanning laser projector includes a red laser diode, a green laser diode, and a blue laser diode;
the first light signal generated by the scanning laser projector includes a red component, a green component, and a blue component; and
the holographic combiner includes a wavelength-multiplexed holographic combiner that includes at least one red hologram, at least one green hologram, and at least one blue hologram, and wherein converging each instance of the first light signal that is received from the optical replicator to a respective exit pupil at or proximate the eye of the user by a respective multiplexed hologram includes:
converging a respective red component of each instance of the first light signal that is received from the optical replicator to a respective exit pupil at or proximate the eye of the user by the at least one red hologram;
converging a respective green component of each instance of the first light signal that is received from the optical replicator to a respective exit pupil at or proximate the eye of the user by the at least one green hologram; and
converging a respective blue component of each instance of the first light signal that is received from the optical replicator to a respective exit pupil at or proximate the eye of the user by the at least one blue hologram.

21. The method of claim 20 wherein the holographic combiner includes a wavelength-multiplexed and angle-multiplexed holographic combiner that includes at least two angle-multiplexed red holograms, at least two angle-multiplexed green holograms, and at least two angle-multiplexed blue holograms, and wherein:
converging a respective red component of each instance of the first light signal that is received from the optical replicator to a respective exit pupil at or proximate the eye of the user by the at least one red hologram includes converging a respective red component of each instance of the first light signal that is received from the optical replicator to a respective exit pupil at or proximate the eye of the user by a respective angle-multiplexed red hologram;

converging a respective green component of each instance of the first light signal that is received from the optical replicator to a respective exit pupil at or proximate the eye of the user by the at least one green hologram includes converging a respective green component of each instance of the first light signal that is received from the optical replicator to a respective exit pupil at or proximate the eye of the user by a respective angle-multiplexed green hologram; and converging a respective blue component of each instance of the first light signal that is received from the optical replicator to a respective exit pupil at or proximate the eye of the user by the at least one blue hologram includes converging a respective blue component of each instance of the first light signal that is received from the optical replicator to a respective exit pupil at or proximate the eye of the user by a respective angle-multiplexed blue hologram.

22. The method of claim 14, further comprising:

generating at least a second light signal by the scanning laser projector;

redirecting respective ones of N instances of the at least a second light signal towards the holographic combiner by the optical replicator; and converging each instance of the at least a second light signal that is received from the optical replicator to a respective exit pupil at or proximate the eye of the user by the holographic combiner.

23. The method of claim 14, further comprising:

generating light signals corresponding to a sweep of a total scan range θ by the scanning laser projector;

receiving the light signals corresponding to the total scan range θ of the scanning laser projector by the optical replicator;

redirecting respective ones of N instances of the total scan range θ of the scanning laser projector towards the holographic combiner by the optical replicator; and converging each instance of the total scan range θ of the scanning laser projector that is received from the optical replicator to a respective exit pupil at or proximate the eye of the user by the holographic combiner.

24. The method of claim 14 wherein the first light signal includes an image comprising at least two pixels and redirecting respective ones of N instances of the first light signal towards the holographic combiner by the optical replicator includes redirecting N respective instances of a same image towards the holographic combiner by the optical replicator.

25. The method of claim 14 wherein redirecting respective ones of N instances of the first light signal towards the holographic combiner by the optical replicator includes redirecting N respective instances of a same pixel in a different instance of a same image towards the holographic combiner by the optical replicator.

* * * * *